(12) United States Patent
Zhang et al.

(10) Patent No.: US 11,733,991 B2
(45) Date of Patent: Aug. 22, 2023

(54) DATA PROCESSING METHOD BASED ON INTELLIGENT CONTRACT, DEVICE, AND STORAGE MEDIUM

(71) Applicant: TENCENT TECHNOLOGY (SHENZHEN) COMPANY LIMITED, Shenzhen (CN)

(72) Inventors: Yao Zhang, Shenzhen (CN); Tao Yang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 321 days.

(21) Appl. No.: 17/157,965

(22) Filed: Jan. 25, 2021

(65) Prior Publication Data

US 2021/0149663 A1 May 20, 2021

Related U.S. Application Data

(63) Continuation of application No. PCT/CN2020/101558, filed on Jul. 13, 2020.

(30) Foreign Application Priority Data

Aug. 29, 2019 (CN) .......................... 201910808351.8

(51) Int. Cl.
*G06F 9/44* (2018.01)
*G06F 8/65* (2018.01)
(Continued)

(52) U.S. Cl.
CPC ............ *G06F 8/65* (2013.01); *G06F 16/2379* (2019.01); *G06F 21/572* (2013.01);
(Continued)

(58) Field of Classification Search
CPC ....................................................... G06F 8/65
(Continued)

(56) References Cited

U.S. PATENT DOCUMENTS

2013/0055233 A1   2/2013   Hatton et al.
2018/0316508 A1*  11/2018  Schulz .................. H04L 63/123
(Continued)

FOREIGN PATENT DOCUMENTS

CN   103544030 A   1/2014
CN   106648669 A   5/2017
(Continued)

OTHER PUBLICATIONS

The World Intellectual Property Organization (WIPO) International Search Report for PCT/CN2020/101558 dated Oct. 9, 2020 7 Pages (including translation).
(Continued)

*Primary Examiner* — Evral E Bodden
(74) *Attorney, Agent, or Firm* — Anova Law Group, PLLC

(57) ABSTRACT

Embodiments of the present disclosure disclose a data processing method based on an intelligent contract, a device, and a storage medium. The method includes: receiving a firmware update request corresponding to a first server node transmitted by an execution node, the firmware update request including an updated version parameter of the first server node; invoking an intelligent contract according to the firmware update request; obtaining, from a blockchain based on the intelligent contract, a firmware version update record and a firmware version release record that are associated with the first server node; and determining validity of the firmware update request according to the firmware version update record, the firmware version release record, and the updated version parameter. The firmware version release
(Continued)

record is determined by a release node on the blockchain based on a consensus mechanism.

18 Claims, 11 Drawing Sheets

(51) Int. Cl.
  *G06F 16/23* (2019.01)
  *G06F 21/57* (2013.01)
  *H04L 9/32* (2006.01)
  *H04L 41/082* (2022.01)
  *H04L 67/00* (2022.01)
  *H04L 9/00* (2022.01)

(52) U.S. Cl.
  CPC .......... *H04L 9/3247* (2013.01); *H04L 41/082* (2013.01); *H04L 67/34* (2013.01); *G06F 2221/033* (2013.01); *H04L 9/50* (2022.05)

(58) Field of Classification Search
  USPC .......................................................... 717/170
  See application file for complete search history.

(56) References Cited

U.S. PATENT DOCUMENTS

| | | | | |
|---|---|---|---|---|
| 2019/0146778 A1* | 5/2019 | Smith | ..................... | H04L 67/34 717/170 |
| 2019/0163912 A1* | 5/2019 | Kumar | ..................... | H04L 41/08 |
| 2020/0058007 A1* | 2/2020 | Karame | ................ | H04L 9/0894 |

FOREIGN PATENT DOCUMENTS

| | | | | |
|---|---|---|---|---|
| CN | 106972961 | A | 7/2017 | |
| CN | 107329794 | A | 11/2017 | |
| CN | 108830720 | A | 11/2018 | |
| CN | 109493216 | A | 3/2019 | |
| CN | 109889589 | A | 6/2019 | |
| CN | 110535938 | A | 12/2019 | |
| DE | 102018129354 | A1 * | 5/2020 | ............. G06F 21/51 |
| KR | 101796690 | B1 | 11/2017 | |
| WO | 2019148050 | A1 | 8/2019 | |

OTHER PUBLICATIONS

The State Intellectual Property Office of the People's Republic of China (SIPO) Office Action 1 for 201910808351.8, dated Jan. 14, 2021 9 Pages (including translation).
Brett Hansen, "Enhanced BIOS Verification Protects PC Firmware Against Sophisticated Threats," Apr. 29, 2019, Retrieved from the Internet: URL: https://www.delltechnologies.com/en-us/blog/bios-verification-protects-pc-firmware-against-threats/, [retrieved on Jan. 15, 2021]. 2 pages.
Intel SGX, Retrieved from the Internet:URL: https//software.intel.com/en-us/sgx, [retrieved on Jan. 25, 2021]. 10 pages.
UEFI Tool, Retrieved from the Internet:URL: https://github.com/LongSoft/UEFITool, [retrieved on Jan. 25, 2021]. 4 pages.
Chipsec Tool, Retrieved from the Internet:URL: https://github.com/chipsec/chipsec, [retrieved on Jan. 25, 2021]. 3 pages.
Alexander Yohan et al., "An Over-the Blockchain Firmware Update Framework for IoT Devices." Dec. 10, 2018, p. 1-8, 2018 IEEE Confrence on Dependable and Secure Computing.
Akshay Pillai et al., "Securing Firmware in Internet of Things using Blockchain", Jun. 6, 2016, IEEE, 2019 5th International Conference on Advanced Computing & Communication Systems.
The European Patent Office (EPO) Extended Search Report for EP Application No. 20829525.3 dated Sep. 20, 2022 12 Pages.
Korean Intellectual Property Office (KIPO) The Office Action for KR Application No. 10-2021-7010913 dated Aug. 4, 2022 33 Pages (Translation Included ).

* cited by examiner

DATA PROCESSING METHOD BASED ON INTELLIGENT CONTRACT, DEVICE, AND STORAGE MEDIUM

CROSS-REFERENCES RELATED APPLICATIONS

This application is a continuation application of PCT Patent Application No. PCT/CN2020/101558, filed on Jul. 13, 2020, which claims priority to Chinese Patent Application No. 201910808351.8, entitled "DATA PROCESSING METHOD BASED ON INTELLIGENT CONTRACT, DEVICE, AND STORAGE MEDIUM" filed with the National Intellectual Property Administration, PRC on Aug. 29, 2019, the entire contents of both of which are incorporated herein by reference.

FIELD OF THE TECHNOLOGY

The present disclosure relates to the field of Internet technologies, and in particular, to a data processing method based on an intelligent contract, a device, and a storage medium.

BACKGROUND OF THE DISCLOSURE

Server firmware is a program written into an erasable programmable read-only memory (EPROM) or an electrically erasable programmable read-only memory (EEPROM) of a server. It is to be understood that basic parameters and programs of a hardware device in a corresponding operating system may be stored in the server firmware, which can provide a most direct hardware control at a bottom level for the operating system.

Currently, operation and maintenance personnel of a server may perform an update operation on firmware (for example, firmware of a basic input/output system (BIOS)) of the server through a firmware update method such as offline analysis, an in-band network, or system management interrupt, to add new functions to the operating system or repair an abnormality of the operating system.

SUMMARY

Embodiments of the present disclosure provide a data processing method based on an intelligent contract, a device, and a storage medium, to improve security and reliability of firmware update.

An embodiment of the present disclosure provides a data processing method based on an intelligent contract, performed by an electronic device as a contract node. The method includes: receiving a firmware update request corresponding to a first server node transmitted by an execution node, the firmware update request including an updated version parameter of the first server node; invoking an intelligent contract according to the firmware update request; obtaining, from a blockchain based on the intelligent contract, a firmware version update record and a firmware version release record that are associated with the first server node; and determining validity of the firmware update request according to the firmware version update record, the firmware version release record, and the updated version parameter. The firmware version release record is determined by a release node on the blockchain based on a consensus mechanism.

An embodiment of the present disclosure provides a data processing apparatus based on an intelligent contract, applied to a contract node, the apparatus including: a memory and a processor coupled to the memory. The memory is configured to store program code, and the processor is configured to execute the program code to perform: receiving a firmware update request corresponding to a first server node transmitted by an execution node, the firmware update request including an updated version parameter of the first server node; invoking an intelligent contract according to the firmware update request; obtaining, from a blockchain based on the intelligent contract, a firmware version update record and a firmware version release record that are associated with the first server node; and determining validity of the firmware update request according to the firmware version update record, the firmware version release record, and the updated version parameter. The firmware version release record is determined by a release node on the blockchain based on a consensus mechanism.

An embodiment of the present disclosure provides a non-transitory computer storage medium, storing a computer program, the computer program including program instructions, the program instructions, when executed by a processor, causing the method according to any one of the embodiments in the present disclosure to be performed. For example, the program instructions cause the processor to perform: receiving a firmware update request corresponding to a first server node transmitted by an execution node, the firmware update request including an updated version parameter of the first server node; invoking an intelligent contract according to the firmware update request; obtaining, from a blockchain based on the intelligent contract, a firmware version update record and a firmware version release record that are associated with the first server node; and determining validity of the firmware update request according to the firmware version update record, the firmware version release record, and the updated version parameter. The firmware version release record is determined by a release node on the blockchain based on a consensus mechanism.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. Based on the embodiments in the application, all other embodiments obtained by a person skilled in the art without paying any creative efforts all fall within the protection scope of the application.

Currently, because firmware provided by an official website of a server vendor is in an open download state, regardless of which firmware update method is used, operation and maintenance personnel may download firmware of a corresponding model from the official website of the server vendor, and perform a firmware upgrade operation according to steps of the used firmware update method. Therefore, once data in the firmware for firmware update is illegally penetrated and tampered with, security protection at a bottom level of an operating system is seriously threatened. In other words, the existing firmware update method cannot ensure security and reliability of firmware update.

Figure 1:
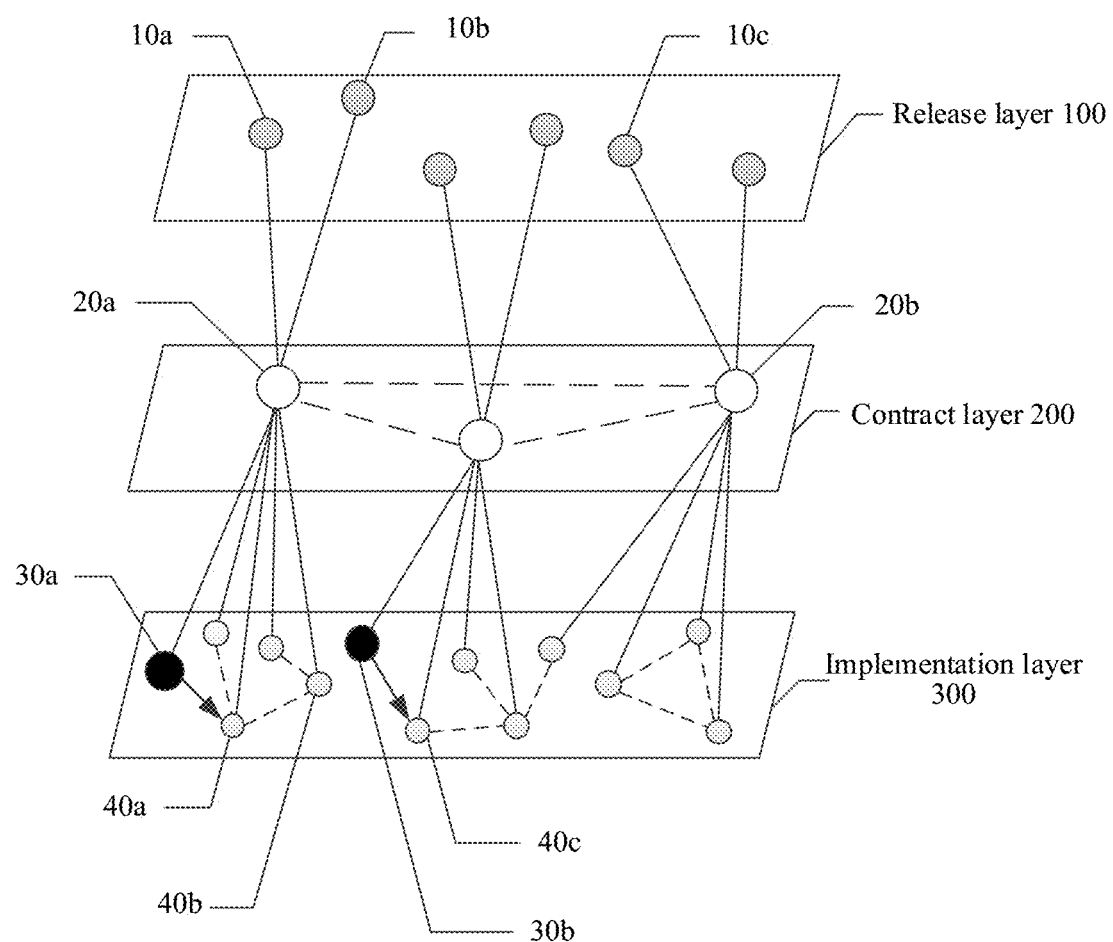
FIG. 1 is a schematic structural diagram of a blockchain network topology structure according to an embodiment of the present disclosure.

FIG. 1 is a schematic structural diagram of a blockchain network topology structure according to an embodiment of the present disclosure. The blockchain network topology structure shown in FIG. 1 may be applied to an application scenario with a large-scale server in an enterprise intranet. As shown in FIG. 1, the blockchain network topology structure may include a release layer 100, a contract layer 200, and an implementation layer 300 that are shown in FIG. 1.

As shown in FIG. 1, a node located in the release layer 100 may be referred to as a release node, and may specifically include a release node 10a, a release node 10b, and a release node 10c that are shown in FIG. 1. It is to be understood that the release layer 100 may further include another release node (not shown in FIG. 1). As shown in FIG. 1, a node located in the contract layer 200 may be collectively referred to as a contract node, and the contract node may be understood as a node that can invoke and execute an intelligent contract stored in a blockchain. Specifically, the contract layer 200 may include a contract node 20a and a contract node 20b that are shown in FIG. 1. As shown in FIG. 1, nodes located in the implementation layer 300 mainly include two types of nodes, one type of node in the two types of nodes may be referred to as an execution node, and the other type of node may be referred to as a server node. The execution node may specifically include an execution node 30a and an execution node 30b that are shown in FIG. 1. Similarly, the server node may specifically include a server node 40a, a server node 40b, and a server node 40c that are shown in FIG. 1.

It is to be understood that, as shown in FIG. 1, the release node, the contract node, the execution node, and the server node that are located in the blockchain network topology structure may be collectively referred to as a node in a blockchain network. In the blockchain network, the nodes may be fully connected with each other. For example, as shown in FIG. 1, a first network connection manner between the release node 10a and the contract node 20a may be referred to as a fully connected manner, that is, in one embodiment of the present disclosure, a network connection manner capable of connection in one hop may be referred to as a fully connected manner. In one embodiment of the present disclosure, the nodes in the blockchain may be further connected through a physical network. For example, as shown in FIG. 1, a second network connection manner between the contract node 20a and the contract node 20b may need to be connected through the physical network (for example, a virtual network adapter), that is, a network connection manner that incapable of connection in one hop may be referred to as a physical network connection manner through the physical network.

The release node 10a shown in FIG. 1 may receive a latest version firmware file (for example, a firmware file x) released by a vendor (for example, a vendor A). Further, the release node 10a may perform file structure parsing on the obtained firmware file x, to further determine an internal version number (for example, a latest firmware version number AAAA) of the firmware file x according to file content in the firmware file x, and calculate a hash value (for example, a hash value 1) corresponding to the version number. Further, as shown in FIG. 1, the release node 10a in the blockchain network may release a firmware version release parameter (that is, the latest firmware version number AAAA and the hash value 1) of the vendor A to the adjacent contract node 20a by using a full connection with the contract node 20a. In addition, the contract node may propagate the version release parameter of the vendor A to another contract node (for example, the contract node 20b) in the contract layer 200. In other words, in one embodiment of the present disclosure, the release node may broadcast, to all contract nodes in the contract layer 200, the firmware version release parameter (that is, the firmware version number AAAA and the hash value 1) released by the vendor A.

It is to be understood that, when releasing the firmware version release parameter to the contract node 20a, the release node 10a may sign the firmware version release parameter by using a private key of the release node 10a, and use signed information and a public key of the release node 10a as version release confirmation information, to give the version release confirmation information to the contract node 20a together, so that the contract node 20a may complete a consensus on the blockchain by using a time threshold mechanism (that is, within a preset time window T). In one embodiment of the present disclosure, on a blockchain network (for example, a private blockchain network) in an enterprise, the consensus of the blockchain may be limited to be performed on the contract node in the contract layer 200.

For example, after receiving the version release confirmation information sent by the release node 10a, the contract node 20a may wait within the preset time window T. If there is another release node (for example, the release node 10b shown in FIG. 1) that also broadcasts the same firmware version release parameter within the time window T, it indirectly indicates that a consensus is reached between the release nodes. In this case, the contract node may write a firmware version release record including the version release parameter into a blockchain, to ensure that a contract consensus is reached. Otherwise, if the firmware version release parameter that is released by the vendor A and that is released and/or broadcast by another release node is received at another time beyond the time window T, it indirectly indicates that the version release parameter released by the vendor A is not accepted. In this case, the contract node does not write a block that includes the version release parameter and that is broadcast by the release node 10a and received within the time window T into the blockchain. It can be learned that, in one embodiment of the present disclosure, a systematic risk caused by an illegal attacker intrusion on a release node may be effectively and fundamentally avoided by using the consensus between the nodes.

It is to be understood that, because the contract nodes in the contract layer 200 may communicate with each other through a physical network, after receiving the block including the version release parameter, the contract node 20a may synchronize the block including the version release parameter with the contract nodes, to further reach the contract consensus. That is, in one embodiment of the present disclosure, the version release parameter (that is, the firmware version number AAAA and the hash value 1) released by the vendor A may be further effectively determined on the blockchain as vendor firmware information of a latest version by using a consensus mechanism.

The blockchain described in one embodiment of the present disclosure is a special distributed database, or may be referred to as a distributed ledger system. The distributed database (that is, the blockchain) may have the following two functions: One function is to store information, that is, a node on the blockchain may write any information that needs to be stored, into a blockchain after reaching a consensus by using the foregoing time threshold mechanism, and may reach the contract consensus on the blockchain by using the consensus mechanism. It is to be understood that, the consensus mechanism herein may further include manners such as a proof of work (PoW), a proof-of-stake (PoS), and a practical byzantine fault tolerance (PBFT), which are not limited herein. The other function is that anyone may set up a server and add the server to a blockchain network to become a node. Therefore, the distributed ledger system may be understood as an asset database that may be shared in a blockchain network formed by a plurality of stations, different geographic locations, or a plurality of organizations. A participant in a blockchain network may obtain a unique copy of a real ledger. Any modification in the ledger is reflected in all copies, and a reflection time may be within several minutes or even seconds.

It is to be understood that, in the same blockchain network, reaching of a consensus of the blockchain (that is, a consensus between the release nodes and a consensus between the contract nodes) and execution of the intelligent contract may be limited to be performed on a specific contract node. The intelligent contract described in the present disclosure is a firmware update contract in which an executor performing an update operation (for example, the execution node 30a shown in FIG. 1) and an updated server (that is, the server node 40a shown in FIG. 1) jointly participate. The firmware update contract may be used for indicating that when receiving a request for firmware update (that is, a firmware update request) of the execution node 30a for the server node 40a (that is, a first server node), the contract node 20a may obtain, from the blockchain, a firmware version update record and a firmware version release record that are associated with the first server node and an updated version parameter in the firmware update request, to determine validity of the firmware update request transmitted by the execution node 30a. In view of this, in one embodiment of the present disclosure, it indicates that when the contract node 20a determines that the firmware update request is a valid update request, the execution node 30a may be allowed to update, based on the updated version parameter, a running version parameter currently run by the first server node. Otherwise, the execution node cannot perform firmware update on the first server node. It can be learned that whether the firmware update operation is valid or invalid may be effectively distinguished by invoking the intelligent contract, to avoid firmware update in an invalid case, thereby effectively improving security and reliability of the firmware update.

In one embodiment of the present disclosure, the blockchain may be formed by blocks in a block structure. The blockchains formed by the blocks may be referred to as a nested hash chain, that is, each block in the nested hash chain includes a hash of a previous block and a plurality of pieces of historical version update behavior information for performing firmware update on the first server node (for example, the server node 40a shown in FIG. 1). A version update record including the historical version update behavior information may be collectively referred to as a firmware version update record. It is to be understood that, in one embodiment of the present disclosure, the block may include a corresponding firmware version update record, and in one embodiment of the present disclosure, the block may further include a corresponding firmware version release record. For ease of understanding, in one embodiment of the present disclosure, the block including the firmware version update record may be collectively referred to as a first block, and the block including the firmware version release record may be collectively referred to as a second block. The first block may include the firmware version update record, version update behavior information in the firmware version update record may carry a first version parameter and a second version parameter, and the second version parameter is a version parameter obtained after firmware update is performed on the first version parameter. It can be learned that the firmware version update record may be used for recording version update behavior information of a behavior of performing an update operation on firmware version information of the first server node. If a firmware update operation on a plurality of pieces of firmware in the first server node has been completed, a plurality of pieces of historical version update behavior information may be generated.

In one embodiment of the present disclosure, the firmware version update records corresponding to all valid firmware update operations and the firmware version release records corresponding to version release operations may be recorded in the blockchain, so that the release node may query a secure state of each server node on a chain subsequently. For example, the release node may perform security audit on off-chain firmware information and on-chain firmware information of each server node, to find a suspected abnormal server node from large-scale server nodes for alarm and use a corresponding emergency response process. For example, network isolation may be performed on the suspected abnormal server node, thereby effectively improving a capability of sensing an illegal intrusion means and significantly increasing security of an enterprise intranet.

In one embodiment of the present disclosure, as shown in FIG. 1, before performing firmware update on the server node 40*a* (that is, the first server node), the execution node 30*a* may transmit a firmware update request to the contract node 20*a* shown in FIG. 1. Therefore, when the contract node 20*a* determines that the firmware update request is a valid update request, the execution node 30*a* may be allowed to perform the firmware update. In one embodiment of the present disclosure, after the firmware update is performed on the first server node (for example, the server node 40*b* shown in FIG. 1), a new firmware version update record may be generated, and a block including the new firmware version update record may be referred to as a new first block. Therefore, the new first block may be sequentially written into the blockchain, so that the release node may subsequently perform audit on a secure state of the first server node on the blockchain. That is, the release node may evaluate the secure state of the first server node based on on-chain firmware information of the first server node stored in the first block in the blockchain and off-chain firmware information collected locally. If the on-chain firmware information is consistent with the off-chain firmware information, a normal value may be returned. Otherwise, it indicates that the secure state of the first server node is abnormal. In this case, the release node may return, in a manner of mobile terminal or web terminal alarm information, alarm information (that is, worksheet information) to a user corresponding to the first server node.

For a specific process in which the contract node 20*a* obtains the firmware update request and performs authentication on the validity of the firmware update request based on the firmware version release record, the firmware version update record, and the updated version parameter, reference may be made to the following embodiments corresponding to FIG. 2 to FIG. 8.

Figure 2:
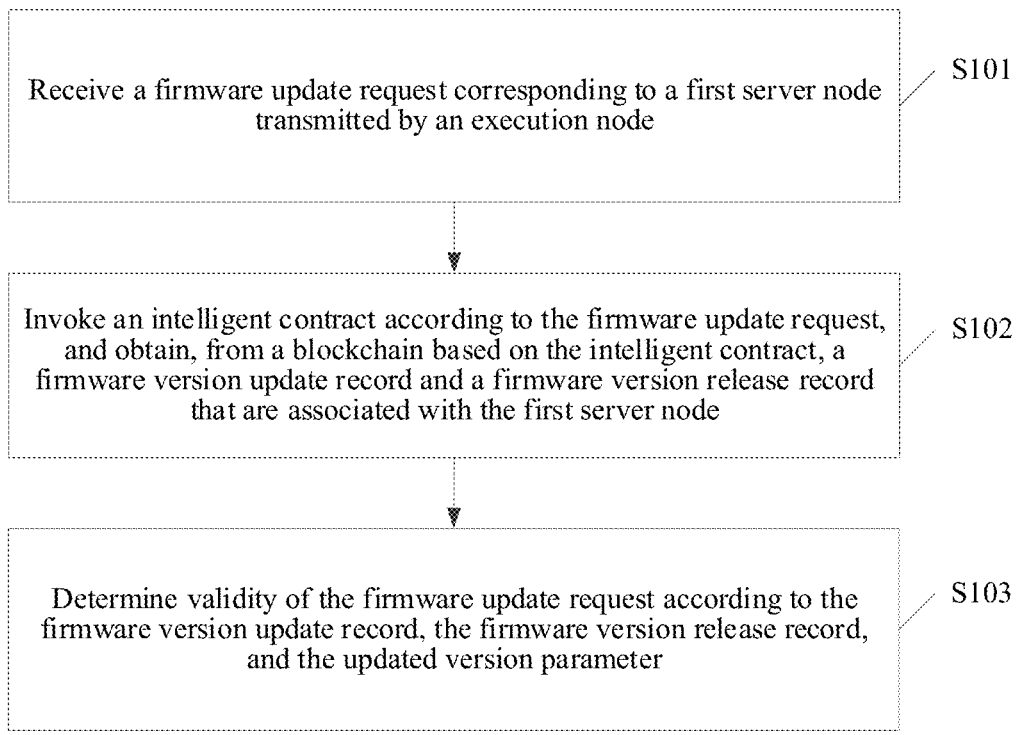
FIG. 2 is a schematic flowchart of a data processing method based on an intelligent contract according to an embodiment of the present disclosure.

Further, FIG. 2 is a schematic flowchart of a data processing method based on an intelligent contract according to an embodiment of the present disclosure. As shown in FIG. 2, the method may be applicable to an electronic device as a contract node and may specifically include step S101 to step S103.

Step S101. Receive a firmware update request corresponding to a first server node transmitted by an execution node.

Specifically, the contract node may receive the firmware update request transmitted by the execution node for the first server node. It is to be understood that, in one embodiment of the present disclosure, to ensure security and reliability of firmware update, before performing the firmware update on the first server node, the execution node needs to transmit a firmware update request to the contract node, and the firmware update request may include at least an updated version parameter of the first server node. In one embodiment of the present disclosure, the firmware update request may further include a running version parameter of the first server node.

The running version parameter may include old firmware version information currently run by the first server node and a hash value of the old firmware version information. In one embodiment of the present disclosure, the updated version parameter may include new firmware version information currently planned to perform firmware update on the first server node and a hash value of the new firmware version information. For ease of understanding, in one embodiment of the present disclosure, the old firmware version information currently run by the first server node may be referred to as running version information (for example, a firmware version V1), and the hash value of the old firmware version information may be referred to as a running version hash value (for example, a hash value H1). In addition, in one embodiment of the present disclosure, the new firmware version information currently planned to perform the firmware update on the first server node may be referred to as updated version information (for example, a firmware version V2), and the hash value of the new firmware version information may be referred to as an updated version hash value (for example, a hash value H2). It may be understood that the running version hash value herein may be further referred to as an old firmware hash value. Similarly, the updated version hash value may be further referred to as a new firmware hash value.

In one embodiment of the present disclosure, before transmitting the firmware update request, the execution node may refer to an obtained running version parameter and updated version parameter as input information that is subsequently used for generating a firmware version update record, that is, the execution node may refer to the running version parameter (that is, the firmware version V1 and the hash value H1) currently run by the first server node and the updated version parameter (that is, the firmware version V2 and the hash value H2) planned to update firmware of the first server node as input information, sign the input information by using a private key of the execution node, and add signed first signature information and a public key of the execution node into an update request, to obtain the firmware update request. Therefore, in one embodiment of the present disclosure, after receiving the firmware update request, the contract node may perform signature verification on the first signature information of the execution node by using the received public key of the execution node, and obtain, when the signature verification succeeds, the updated version parameter and the running version parameter that are provided by the execution node.

The execution node may be the execution node 30*a* located in the implementation layer 300 in the foregoing embodiment corresponding to FIG. 1, the first server node may be the server node 40*a* located in the implementation layer 300 in the foregoing embodiment corresponding to FIG. 1, and the contract node may be the contract node 20*a* located in the contract layer 200 in the foregoing embodiment corresponding to FIG. 1. In one embodiment of the present disclosure, the execution node 30*a*, the server node 40*a*, and the contract node 20*a* in the blockchain may be collectively referred to as a node in the blockchain network. It is to be understood that for each node added into the blockchain, the blockchain may allocate a corresponding public key pair and a corresponding private key pair to the node. The public key of the each node may be learned by another node in the blockchain. However, a respective private key may be independently and properly stored by a corresponding node. For example, for the server node, because an entity is a physical device, a private key of the server node may be stored based on a trusted computing environment of a trusted execution environment (TEE). In this way, it may be ensured that the another node in the blockchain cannot learn the private key of the server node. In another example, a private key of the execution node may be stored by using a specific storage medium. It can be learned that the private keys of the nodes in the blockchain are properly stored, so that security and reliability of a subsequent contract execution process may be ensured.

It is to be understood that the blockchain allocates a corresponding public key pair and a corresponding private key pair to an execution node in the implementation layer 300, which is equivalent to assigning special identities to the execution nodes, thereby effectively improving difficulty of forging, by an illegal attacker, an identity of the execution node to invalidly operate server firmware.

Step S102. Invoke an intelligent contract according to the firmware update request, and obtain, from a blockchain based on the intelligent contract, a firmware version update record and a firmware version release record that are associated with the first server node, the firmware version release record being determined by a release node on the blockchain based on a consensus mechanism.

Specifically, the contract node may invoke the intelligent contract to obtain a blockchain address of the first server node in the blockchain, and the blockchain address is uniquely determined by the blockchain after hash calculation is performed according to public key information of the first server node. Further, the contract node may obtain, based on the blockchain address from the blockchain, a first block and a second block that are associated with the first server node. Further, the contract node may determine, in the first block, historical version update behavior information carrying a first version parameter and a second version parameter as a firmware version update record associated with the first server node, and the second version parameter is a version parameter obtained after firmware update is performed on the first version parameter. Further, the contract node may determine, in the second block, historical version release behavior information associated with the first server node as a firmware version release record.

In one embodiment of the present disclosure, it may be learned from the blockchain network topology structure shown in FIG. 1 that each node (that is, each distributed node) in the blockchain network may be used as an individual to receive, process, and feed back information in a blockchain system. In other words, the nodes located in the blockchain network not only receive information but also generate information, and communication may be kept between the nodes by maintaining a common blockchain.

In one embodiment of the present disclosure, a node (for example, the contract node) in a blockchain network may create a new block. Other nodes (for example, other contract nodes in the foregoing embodiment corresponding to FIG. 1) in the blockchain network are notified in a manner of broadcast after the new block is created, and then verify the block. When verification of more than 51% nodes in the blockchain network succeeds, it is determined that a consensus (for example, a contract consensus) between the nodes is reached. In this case, the new block may be added to the blockchain.

In one embodiment of the present disclosure, in a process of updating and controlling firmware of a server node by using an intelligent contract, the contract node may record version update behavior information of firmware update performed each time by the execution node on a first version parameter of firmware (for example, the first server node is the server node 40a in the foregoing embodiment corresponding to FIG. 1) in the server node by using a second version parameter. In one embodiment of the present disclosure, an update operation may be performed on one or more pieces of firmware in the server node, and this is not limited herein.

In one embodiment of the present disclosure, each time the execution node completes an operation of updating firmware in the server node, the execution node may generate a piece of firmware update log information, that is, generate a sub-firmware version update record. One piece of firmware update log information (that is, the sub-firmware version update record) may include version update behavior information of firmware update performed on firmware in the first server node. In one embodiment of the present disclosure, the contract node may further collectively refer to a sub-firmware version update record including version update behavior information of each piece of firmware as a firmware version update record of firmware in the first server node.

In one embodiment of the present disclosure, old firmware version information and an old firmware hash value obtained before the firmware in the first server node is updated may be referred to as the first version parameter, and new firmware version information and a new firmware hash value obtained after the firmware in the first server node is updated may be referred to as the second version parameter.

In an application scenario in which firmware update is performed on the server node 40a, all update results of determined validity (that is, the firmware version update record) may be sequentially written into a blockchain. In this way, when currently receiving the firmware update request in step S101, a server node may obtain, based on a blockchain address of the server node from the blockchain, a first block and a second block that are associated with firmware of the first server node. In one embodiment of the present disclosure, the first block may include at least one first block. Each first block may carry a firmware version update record corresponding to a corresponding update timestamp, and the firmware version update record may include one or more sub-firmware version update records. For ease of understanding, in one embodiment of the present disclosure, each sub-firmware version update record may be collectively referred to as a firmware version update record of corresponding firmware in the first server node. It is to be understood that each time an update operation on version information of corresponding firmware of the first server node is completed, a sub-firmware version update record may be generated, to obtain a firmware version update record.

In one embodiment of the present disclosure, in a block generation time period from generation of a previous block to generation of a new block, if the execution node completes an update operation on only one piece of firmware in the first server node, the execution node may obtain one sub-firmware version update record. In this case, the sub-firmware version update record may be used as a firmware version update record in the new block. In one embodiment of the present disclosure, in the block generation time period, if the execution node has completed an update operation on a plurality of pieces of firmware in the first server node, the execution node may obtain a plurality of sub-firmware version update records. In this case, the sub-firmware version update records may be collectively referred to as a firmware version update record in the new block.

Similarly, in one embodiment of the present disclosure, the second block may include at least one second block. Each second block may carry a firmware version release record corresponding to a corresponding release timestamp. It is to be understood that each time a release operation on version information of corresponding firmware of the first server node is completed, a firmware version release record may be generated.

It is to be understood that in a current process of invoking an intelligent contract, version update behavior information in the firmware version update record obtained by previously invoking the intelligent contract may be referred to as historical version update behavior information, and version release behavior information in the previously obtained firmware version release record may be referred to as historical version release behavior information.

Figure 3:
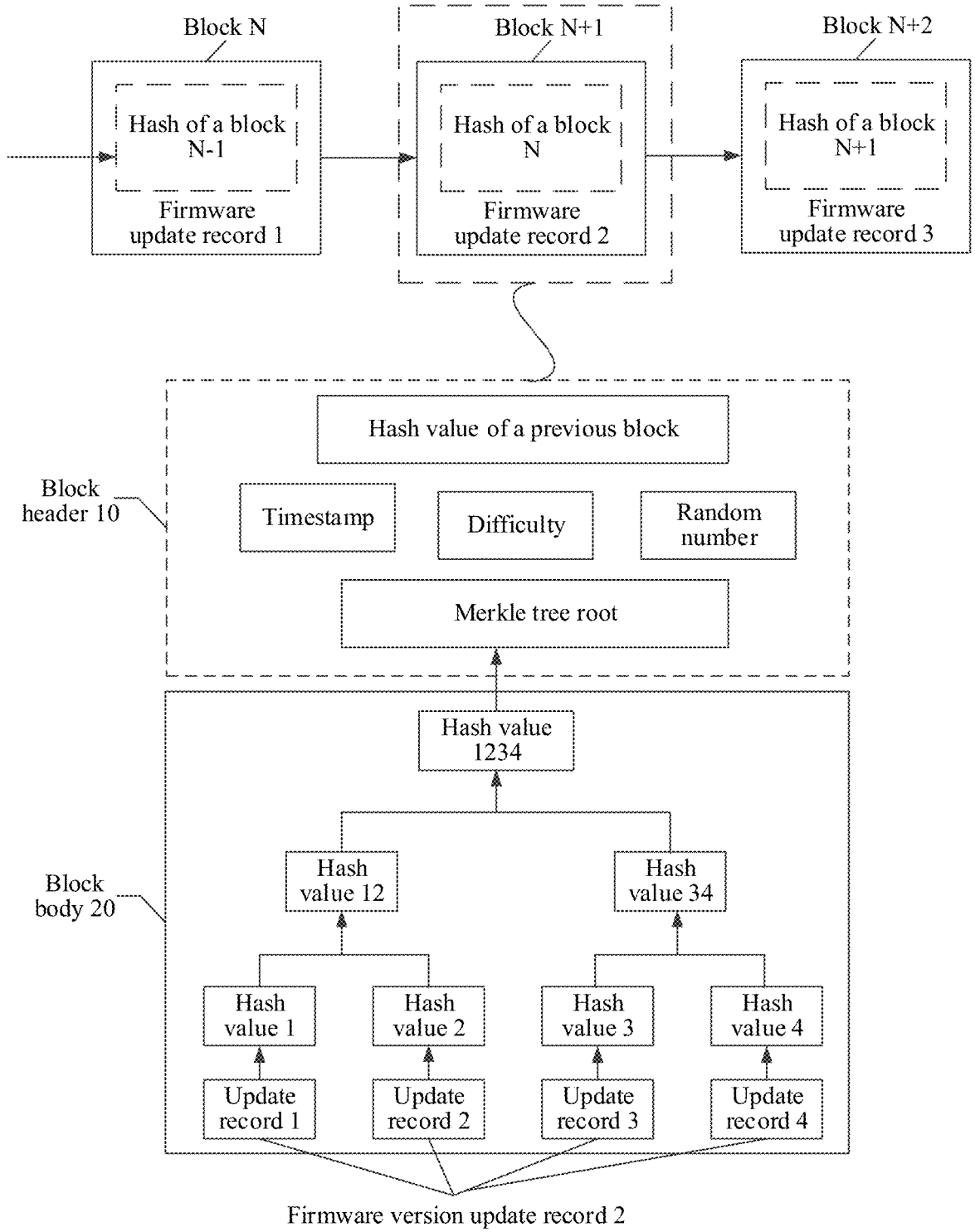
FIG. 3 is a schematic diagram of a block structure of a nested hash chain according to an embodiment of the present disclosure.

For ease of understanding, in one embodiment of the present disclosure, a firmware version update record obtained after firmware update is performed on target firmware in the first server node is used as an example, to describe an association relationship between the firmware version update record of the target firmware and the first block. Further, FIG. 3 is a schematic diagram of a block structure of a nested hash chain according to an embodiment of the present disclosure. The nested hash chain shown in FIG. 3 may include at least a block N, a block N+1, and a block N+2 that are shown in FIG. 3. N may be a positive integer. As shown in FIG. 3, each block records firmware update log information obtained after firmware update is performed on the first server node. In one embodiment of the present disclosure, each piece of firmware update log information (that is, a sub-firmware version update record) may be collectively referred to as a firmware version update record.

Each block (that is, a first block) shown in FIG. 3 may include a hash (referred to as a header) of a previous block (that is, a previous first block) and a corresponding firmware version update record, that is, data in a block in the nested hash chain may have uniqueness and traceability. As shown in FIG. 3, the block N may include a hash value of a block previous to the block N (that is, a hash of a block N−1 shown in FIG. 3) and a firmware version update record 1 obtained after a firmware update operation is performed on the first server node. Similarly, the block N+1 may include a hash value of a block previous to the block N+1 (that is, a hash of the block N shown in FIG. 3) and a firmware version update record 2 obtained after another firmware update operation is performed on the first server node. By analogy, the block N+2 may include a hash value of a block previous to the block N+2 (that is, a hash of a block N+1 shown in FIG. 3) and a firmware version update record 3 obtained after still another firmware update operation is performed on the first server node. It is to be understood that, the block N, the block N+1, and the block N+2 that are shown in FIG. 3 may be referred to as first blocks. The first blocks may include a sub-firmware version update record obtained after an update operation is performed on firmware version information of target firmware (for example, firmware K) in the first server node. For example, the block N may include the sub-firmware version update record of the firmware K, the block N+1 may include the sub-firmware version update record of the firmware K, and the block N+2 may include the sub-firmware version update record of the firmware K.

As shown in FIG. 3, for ease of understanding, in one embodiment of the present disclosure, one block (for example, the block N+1) in the first block is used as an example, to describe that the firmware version update record 2 in the block N+1 may include a plurality of sub-firmware version update records, and specifically, may be an update record 1, an update record 2, an update record 3, and an update record 4 that are shown in FIG. 3. The update record 1 may be the sub-firmware version update record that is found in the block N+1 and that is of the firmware K.

The block N+1 shown in FIG. 3 may include a block header 10 and a block body 20 that are shown in FIG. 3. As shown in FIG. 3, the block header 10 may include a hash value of a previous block (that is, the block N shown in FIG. 3), a timestamp, a calculation difficulty value, a random number set for generating the block N+1, and a Merkle tree root (it is to be understood that the Merkle tree root may be a hash value of the block N+1, that is, the hash value of the block N+1 may be used as a parent block hash value in a block header in the block N+2 shown in FIG. 3). It is to be understood that, in one embodiment of the present disclosure, a hash value of a previous block may be referred to as a parent block hash value. The timestamp in the block header 10 shown in FIG. 3 may uniquely identify a location of one block in the blockchain. In addition, the block body 20 shown in FIG. 3 may include all historical version update behavior information for updating firmware of the first server node in this period of time before the block N+1 is generated and after the block N is generated. In one embodiment of the present disclosure, each time an update operation on one piece of firmware in the first server node is completed, one sub-firmware version update record may be generated (that is, one update record or one piece of firmware update log information may be generated). In one embodiment of the present disclosure, update records corresponding to all completed firmware update operations within this period of time may be referred to as the firmware version update record 2 shown in FIG. 3, that is, the firmware version update record 2 may include a plurality of sub-firmware version update records. Specifically, as shown in FIG. 3, the update record 1, the update record 2, the update record 3, and the update record 4 may be organized together in a Merkle tree form.

It is to be understood that, a construction process of the Merkle tree shown in FIG. 3 is a process of recursively calculating a hash value (that is, recursively calculating a hash value). The update record 1 and the update record 2 in FIG. 3 are used as examples, and a hash value 1 corresponding to the update record 1 may be obtained through calculation by using an SHA256 hash calculation method. Similarly, a hash value 2 corresponding to the update record 2 may be obtained through calculation by using the SHA256 hash calculation method. Further, the hash value 1 and the hash value 2 are connected in series, and hash transformation continues to be performed, to obtain a hash value 12 shown in FIG. 3. By analogy, for the update record 3 and the update record 4, a hash value 34 shown in FIG. 3 may be obtained by performing recursive calculation layer by layer, so that the hash value 12 and the hash value 34 may be further connected in series for performing hash transformation, until finally one root (that is, a hash value 1234 shown in FIG. 3) is left. In this case, in one embodiment of the present disclosure, a finally obtained hash value of all transaction information may be used as a Merkle tree root of the block N+1. It may be learned that the Merkle tree has good scalability, and regardless of the quantity of update records, a Merkle tree and a Merkle tree root with a fixed length may be finally generated. It is to be understood that, in one embodiment of the present disclosure, a structure of the Merkle tree may be used for ensuring efficiency of version searching in a subsequent process of tracing a firmware version.

It is to be understood that, in one embodiment of the present disclosure, version management control (for example, version release control and version update control) may be performed on firmware in the first server node by using the same blockchain network mixing a source of firmware, that is, a server vendor needs to be distinguished during version management control. For example, in a process of performing firmware update on firmware version information released by different vendors, the version update control may be performed by using different contract nodes. For example, the firmware update may be performed, by using the contract node 20a shown in FIG. 1, on firmware version information released by a vendor A, and the firmware update may be performed, by using the contract node 20b shown in FIG. 1, on firmware version information released by a vendor B. In addition, in one embodiment of the present disclosure, different blockchain networks may be further established to manage firmware update of firmware version information released by different vendors. A specific form of establishing the blockchain network is not limited herein.

Further, for ease of understanding, in one embodiment of the present disclosure, for example, an update operation is performed on one piece of firmware (for example, the firmware K) in the first server node as target firmware. When invoking an intelligent contract, a contract node may obtain a blockchain address of the first server node in a blockchain, and consult a blockchain record corresponding to the blockchain address about a historical update status and a historical release status of the firmware K. That is, in one embodiment of the present disclosure, a first block and a second block that are associated with the first server node may be obtained from the blockchain. Therefore, historical version update behavior information carrying a first version parameter and a second version parameter that are of the target firmware in the first block may be used as a firmware version update record associated with the first server node. Meanwhile, the contract node may further use, historical version release behavior information associated with the firmware K in the first server node from the second block, as a firmware version release record, to further perform step S103 and distinguish validity of a firmware update request currently transmitted by an execution node, thereby improving security and reliability of firmware update.

It is to be understood that the firmware version release record is determined by a release node on the blockchain based on a consensus mechanism, that is, in one embodiment of the present disclosure, when a consensus may be reached between the release nodes, it is determined that a new firmware version release parameter released by a release node may be recognized by the contract node. Therefore, when a contract consensus is further reached between the contract nodes, a block including the new firmware version release parameter may be written into the blockchain for storage.

Figure 4A:
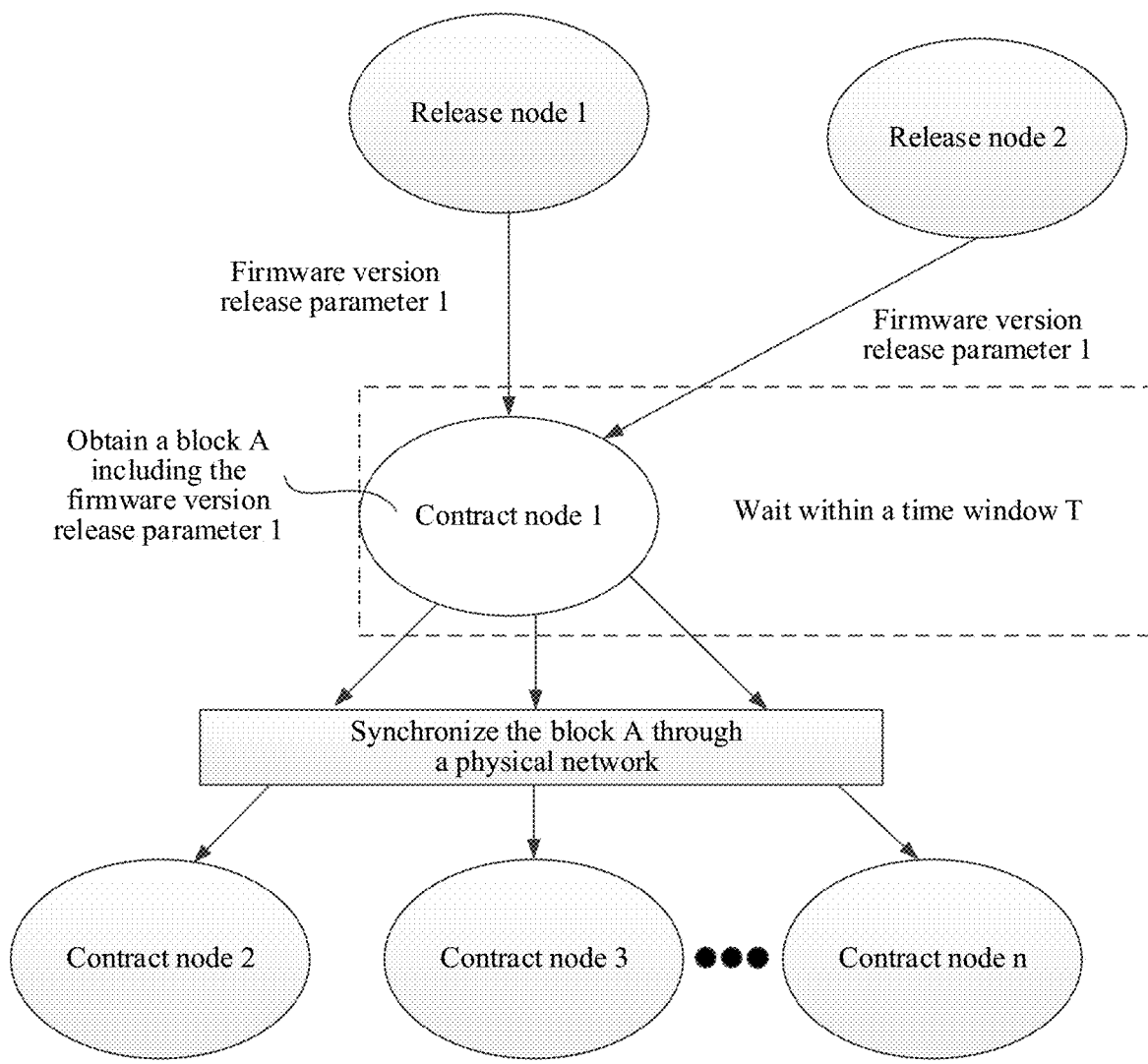
FIG. 4A and FIG. 4B are schematic diagrams of performing version release control according to an embodiment of the present disclosure.
Figure 4B:
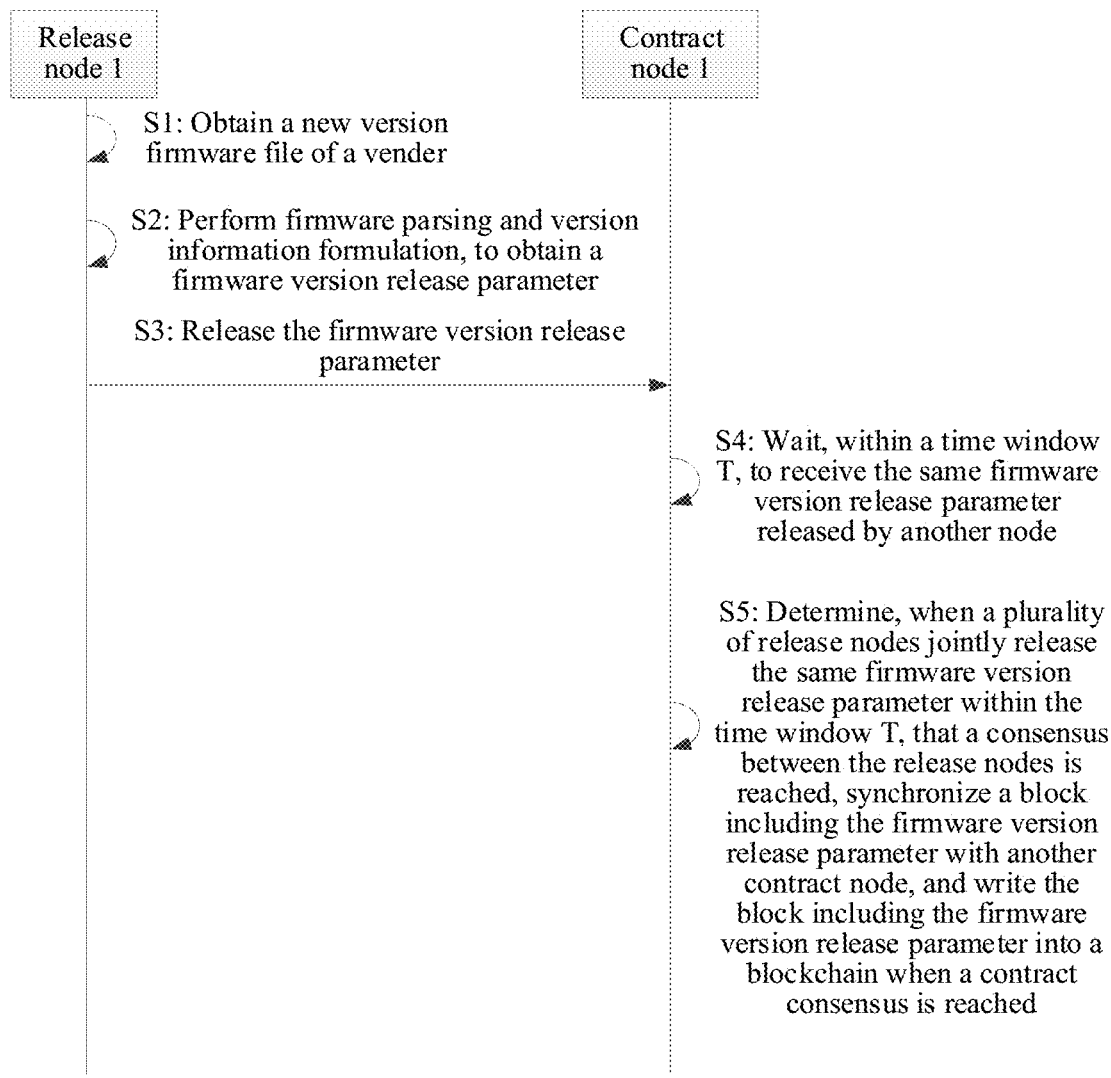

For ease of understanding, further, FIG. 4A and FIG. 4B are schematic diagrams of performing version release control according to an embodiment of the present disclosure. As shown in FIG. 4A, when receiving a new firmware version release parameter (that is, the firmware version release parameter 1) that is of the firmware K and that is broadcast by a release node 1 (for example, may be the release node 10a in the foregoing embodiment corresponding to FIG. 1), a contract node 1 may wait within a time window T shown in FIG. 4A. That is, the contract node may wait, within the preset time window T in the foregoing embodiment corresponding to FIG. 1, to receive the same firmware version release parameter released by another release node. For a specific process in which the contract node obtains the firmware version release parameter, reference may be made to step S1 to step S3 shown in FIG. 4B. As shown in FIG. 4B, the release node 1 may receive a firmware file of a latest version released by a vendor (for example, the vendor A), and perform file structure parsing on the received firmware file of the latest version, to further determine an internal version number of the file according to file content and calculate a hash value of the internal version number. It is to be understood that the internal version number herein is latest firmware version information released by the vendor A for the firmware K in the first server node. The latest firmware version information of the firmware K and a hash value of the latest firmware version information may be referred to as a firmware version release parameter of the firmware K, and a firmware release request carrying the firmware version release parameter may be sent to the contract node 1 shown in FIG. 4B, so that the contract node 1 may perform step S5 shown in FIG. 4B.

In one embodiment of the present disclosure, in a blockchain, to ensure data transmission integrity, before sending the firmware version release parameter of the firmware K to the contract node 1 shown in FIG. 4B, the release node 1 further signs the firmware version release parameter (that is, the firmware version release parameter 1 shown in FIG. 4A) by using a private key of the release node 1, to give a signature result and a public key of the release node 1 to the contract node 1 together. Therefore, when receiving a firmware release request sent by the release node 1, the contract node 1 may perform signature verification on the signature result by using the public key of the release node 1, to obtain the firmware version release parameter 1 carried in the firmware release request.

As shown in FIG. 4A, after obtaining the firmware version release parameter 1, the contract node 1 waits within the time window T. If the same firmware version release parameter (that is, the firmware version release parameter 1) released by another release node (for example, a release node 2 shown in FIG. 4A) exists within the time window T, the contract node 1 may indirectly determine that a consensus between the release node 1 and the release node 2 is reached. In this case, the contract node 1 may obtain a block including the firmware version release parameter 1, and request to write the block including the firmware version release parameter 1 into the blockchain.

In one embodiment of the present disclosure, before writing the block including the firmware version release parameter 1 as a new block (for example, a block A) into the blockchain, the contract node 1 needs to synchronize the block A to other contract nodes in the contract layer 200 in the foregoing embodiment corresponding to FIG. 1 through a physical network. As shown in FIG. 4A, the block A may be synchronized to a contract node 2, a contract node 3, . . . , and a contract node n through the physical network, to write the block (that is, the block A) including the firmware version release parameter 1 into the blockchain when more than 51% contract nodes in the other contract nodes determine that a contract consensus is reached. It can be learned that a consensus between node is limited in a contract node (for example, the contract node 1) having a specified function, and version release control may be effectively performed by using the contract node. That is, when it is determined that firmware version information released by the vendor A is vendor firmware information of the latest version, the block A is written into the blockchain. In this case, in one embodiment of the present disclosure, the block A may be referred to as a second block having a latest release timestamp. That is, version release behavior information in a firmware version release record included in the second block having the latest release timestamp may be referred to as first historical version release behavior information. In addition, version release behavior information in a firmware version release record included in another second block that is in the blockchain and that is associated with the firmware K of the first server node may be referred to as second historical version release behavior information.

In one embodiment of the present disclosure, a block that includes a firmware version release record and that is associated with the first server node may be referred to as a second block. The contract node may obtain, historical version release behavior information associated with target firmware (that is, the firmware K) in the first server node from the second block, to use the obtained historical version release behavior information as a firmware version release record of corresponding firmware. The updated version parameter is compared with the firmware version release record, and it may be determined whether firmware version information of the target firmware (that is, the firmware K) is updated to firmware version information in the latest firmware version release parameter 1.

Step S103. Determine validity of the firmware update request according to the firmware version update record, the firmware version release record, and the updated version parameter.

Specifically, the contract node may perform rollback detection on the updated version parameter based on the first version parameter in the firmware version update record; determine, in response to detecting that that the first version parameter is the same as the updated version parameter, that version rollback exists, and determine that the firmware update request is an invalid update request, the invalid update request being used for indicating that the execution node does not have permission to perform firmware update on version information of the first server node; and determine, in response to detecting that that the first version parameter is different from the updated version parameter, that the version rollback does not exist, and determine validity of the firmware update request based on the updated version parameter and the firmware version release record.

The firmware update request further includes: a running version parameter of the first server node. In this case, the determining, by the contract node, validity of the firmware update request based on the updated version parameter and the firmware version release record may specifically include the following steps: obtaining first version release behavior information from historical version release behavior information associated with the firmware version release record, the first version release behavior information being version release behavior information having a latest version release timestamp in the historical version release behavior information; and further, determining that the firmware update request is a valid update request in response to detecting that that the first version release behavior information includes the updated version parameter.

In one embodiment of the present disclosure, to prevent version rollback, rollback detection may be performed on the updated version parameter for performing firmware update on firmware version information of the firmware K according to the consulted historical version update status of the firmware K. If it is detected that a first parameter in the firmware version update records (for example, the sub-firmware version update record corresponding to the update record 1 shown in FIG. 3) of the firmware K includes updated version information (for example, a firmware version number BBBB) and an updated version hash value (for example, a hash value) in the updated version parameter, it is determined that version rollback exists. Therefore, it may be determined that the firmware update request is the invalid update request. In one embodiment of the present disclosure, all historical version update behavior information of the target firmware (that is, the firmware K) may be obtained, and each piece of historical version update behavior information may be referred to as a firmware version update record.

For ease of understanding, further, Table 1 is a firmware version update record table of firmware K provided in one embodiment of the present disclosure. It is to be understood that each time firmware update is performed on the firmware K once, a firmware version update record of the firmware K may be generated. A firmware version update record A is obtained after the execution node performs firmware update on the firmware K in the first server node for the first time, and a firmware version update record B is obtained after the execution node performs firmware update on the firmware K in the first server node for the second time.

TABLE 1

| Firmware version update record A | First version parameter A1 | Firmware version information 1 | V1 |
|---|---|---|---|
| | | Firmware hash value 1 | H1 |
| | Second version parameter A2 | Firmware version information 2 | V2 |
| | | Firmware hash value 2 | H2 |
| Firmware version update record B | First version parameter B1 | Firmware version information 2 | V2 |
| | | Firmware hash value 2 | H2 |
| | Second version parameter B2 | Firmware version information 3 | V3 |
| | | Firmware hash value 3 | H3 |

When invoking an intelligent contract, the contract node may query a first block associated with the first server node for all firmware version update records associated with target firmware (that is, the firmware K), and construct the firmware version update record table shown in Table 1 according to an update time sequence. As shown in Table 1, if the firmware version update records of the firmware K obtained by querying all the first blocks are the firmware version update record A and the firmware version update record B that are shown in Table 1, and another firmware version update record of the firmware K is not obtained from the first block associated with the first server node, the execution node in one embodiment of the present disclosure may use the firmware version information 3 and the firmware hash value 3 that are in the second version parameter B2 in the firmware version update record B as a running version parameter currently run by the firmware K. That is, the firmware update request received by the contract node may include the second version parameter B2 shown in Table 1, and may further include an updated version parameter (for example, the firmware version information 4 and the firmware hash value 4) planned to perform firmware update on the firmware K. In this case, the contract node may obtain a first version parameter (that is, the first version parameter A1 and the first version parameter B1 shown in Table 1) in each firmware version update record from the firmware version update record table, and perform rollback detection on the updated version parameter according to the two first version parameters. If the two first version parameters are both different from the updated version parameter, it may be determined that version rollback does not exist. Otherwise, if any one of the two first version parameters is the same as the updated version parameter, it may be determined that version rollback exists.

It is to be understood that when it is determined whether the first version parameter is the same as the updated version parameter, updated version information and an updated version hash value that are in the updated version parameter are respectively compared with firmware version information and a firmware version hash value that are in the firmware version parameter of the first version parameter. For example, the updated version information in the updated version parameter may be compared with the firmware version information 2 in the first version parameter B1, and the updated version hash value in the updated version parameter may be compared with the firmware hash value 2 in the first version parameter B1. Therefore, when the updated version information (that is, the firmware version information 4) is the same as the firmware version information 2 in Table 1 and the updated version hash value (that is, the firmware hash value 4) is the same as the firmware hash value 2 in Table 1, it may be determined that version rollback exists.

It is to be understood that when the rollback detection is performed on the updated version parameter by using the first version parameter in the firmware version release record, a firmware version update record (that is, the firmware version update record B) including the running version parameter in the firmware update request may be further first found sequentially by means of traversal, to perform rollback detection on the updated version parameter according to a first version parameter (that is, the first version parameter B1 in Table 1) in the firmware version update record B. If the firmware version information 2 and the firmware version hash value 2 that are in the first version parameter B1 are respectively different from the firmware version information 4 and the firmware version hash value 4 that are in the updated version parameter, a firmware version update record in a previous block may be searched for continuously, until it is determined that none of the firmware version update records of all the first blocks associated with the firmware K in the first server node includes the first version parameter the same as the updated version parameter, and it may be determined that the version rollback does not exist.

The invalid update request is used for indicating that the execution node does not have permission to perform firmware update on version information of the first server node. It can be learned that if the contract node finds a corresponding updated version parameter from the firmware version update record of the firmware K, the contract node determines that the version rollback exists, that is, the execution node has performed firmware update on the firmware K by using the updated version parameter. In this case, the contract node considers a firmware update operation on the firmware K in this case as an invalid operation. In other words, the contract node may determine that the firmware update request is the invalid update request. In one embodiment of the present disclosure, if it is detected that all the first version parameters in Table 1 are different from the updated version parameter, it is determined that the version rollback does not exist. That is, when determining that an updated version parameter currently used for performing firmware update on version information of the firmware K has not been used for performing firmware update on the firmware K, the contract node may further determine validity of the firmware update request based on the updated version parameter and the firmware version release record.

Similarly, if the firmware version release record includes the updated version parameter, whether the firmware version information in the updated version parameter is latest released firmware version information in a latest released firmware version release parameter needs to be further determined. If it is determined that the firmware version information in the updated version parameter is the latest released firmware version information in the latest released firmware version release parameter, it may be determined that contract detection succeeds when hash values of the two are consistent, that is, it is determined that the firmware update request is the valid update request. Otherwise, it is determined that the firmware update request is the invalid update request. In this case, the contract node rejects the invalid firmware update request. In one embodiment of the present disclosure, if the updated version information is not the latest firmware version information, M second server nodes on which firmware update has been performed by using the updated version parameter need to be searched for from the blockchain, and firmware version update information of the M second server nodes may be further obtained. In response to detecting that that second version parameters in version update behavior information of the M second server nodes all include the running version parameter, it is determined that the firmware update request is the valid update request. Otherwise, it is determined that the firmware update request is the invalid update request.

In one embodiment of the present disclosure, if an updated version parameter that is of updated version information and that needs to update target firmware in the first server node already exists on a blockchain, but is not the latest firmware version information, whether each second server node adopts the same update manner as the first server node in the obtained M second server nodes (that is, the same running version parameter and the same updated version parameter are required) needs to be detected. If it is determined that the each second server node adopts the same update manner as the first server node, it may be determined that the firmware update request is the valid update request.

In one embodiment of the present disclosure, when receiving a firmware update request transmitted by the execution node for the first server node, a first terminal may invoke an intelligent contract to perform intelligent update management control on the firmware update request initiated by the execution node, thereby ensuring security of firmware update. The firmware update request may carry an updated version parameter planned to update firmware of the first server node. Further, the contract node may obtain, from a blockchain, a firmware version update record and a firmware version release record that are associated with the first server node, to perform contract detection on the updated version parameter in the firmware update request based on the obtained firmware version update record and firmware version release record, and determine that the firmware update request meeting a contract detection result is a valid update request. Otherwise, it may be determined that the firmware update request that does not meet the contract detection result is an invalid update request. It can be learned that, for all update operations performed by the contract node on firmware at a bottom level of the first server node, a valid firmware update operation or an invalid firmware update operation may be effectively distinguished by using the intelligent contract, to improve reliability of firmware update.

Figure 5:
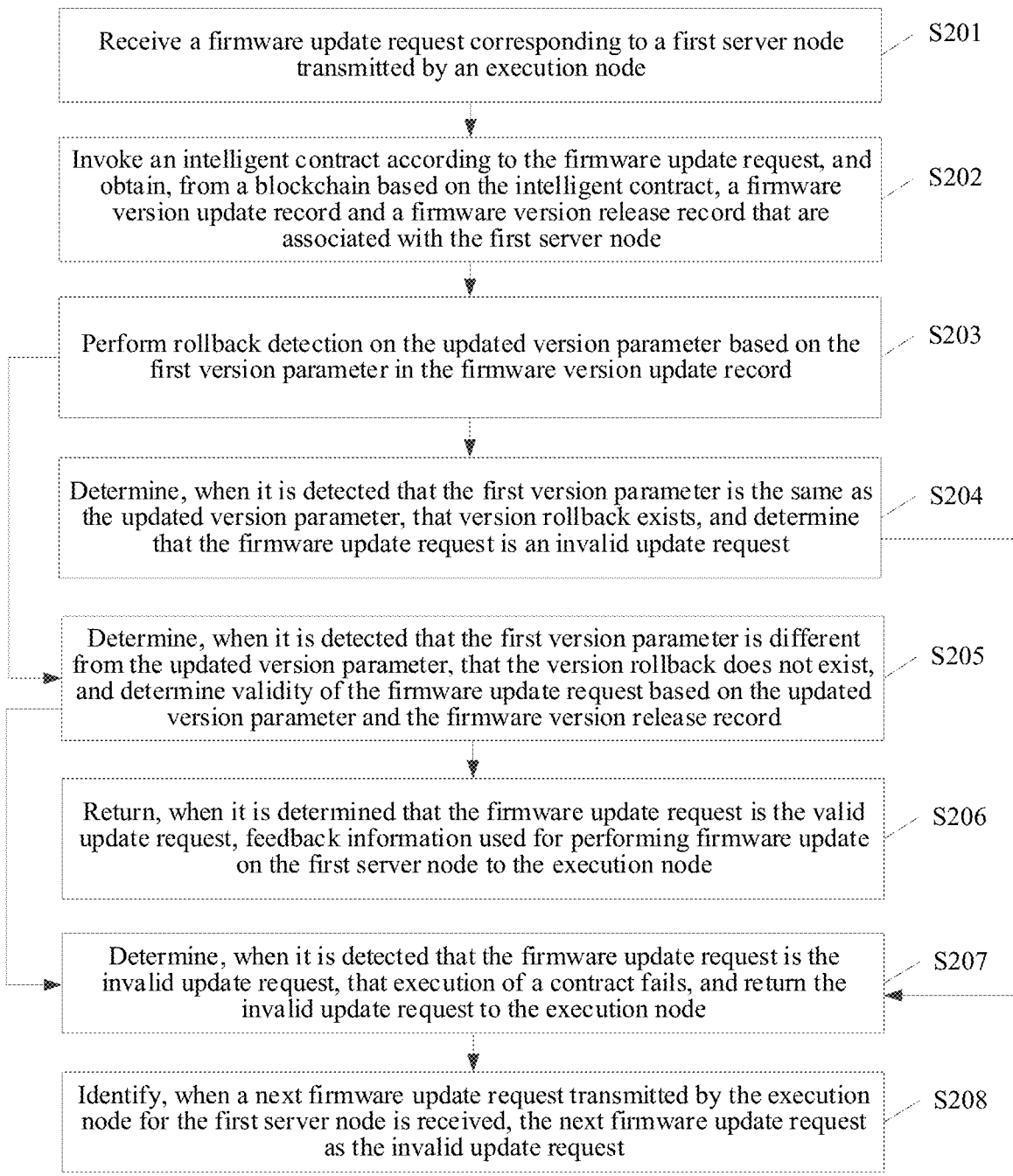
FIG. 5 is a schematic flowchart of another data processing method based on an intelligent contract according to an embodiment of the present disclosure.

Further, FIG. 5 is a schematic flowchart of another data processing method based on an intelligent contract according to an embodiment of the present disclosure. The method may be applicable to an electronic device acting as a contract node and may include the following steps.

Step S201. Receive a firmware update request corresponding to a first server node transmitted by an execution node.

The firmware update request includes at least an updated version parameter of the first server node.

Step S202. Invoke an intelligent contract according to the firmware update request, and obtain, from a blockchain based on the intelligent contract, a firmware version update record and a firmware version release record that are associated with the first server node, the firmware version release record being determined by a release node on the blockchain based on a consensus mechanism.

Specifically, the intelligent contract is invoked and a blockchain address of the first server node in the blockchain is obtained, and the blockchain address is uniquely determined by the blockchain after hash calculation is performed according to public key information of the first server node; a first block and a second block that are associated with the first server node are obtained from the blockchain based on the blockchain address; historical version update behavior information carrying a first version parameter and a second version parameter is determined as a firmware version update record associated with the first server node in the first block, and the second version parameter is a version parameter obtained after firmware update is performed on the first version parameter; and historical version release behavior information associated with the first server node is determined as a firmware version release record in the second block.

Step S203. Perform rollback detection on the updated version parameter based on the first version parameter in the firmware version update record.

Specifically, the contract node may determine, according to a rollback detection result, whether to perform step S204 or step S205 after performing step S203.

Step S204. Determine, in response to detecting that that the first version parameter is the same as the updated version parameter, that version rollback exists, and determine that the firmware update request is an invalid update request.

The invalid update request is used for indicating that the execution node does not have permission to perform firmware update on version information of the first server node. It is to be understood that after determining that the firmware update request is the invalid update request, the contract node may further turn to perform step S207 and step S208.

Step S205. Determine, in response to detecting that that the first version parameter is different from the updated version parameter, that the version rollback does not exist, and determine validity of the firmware update request based on the updated version parameter and the firmware version release record.

Specifically, the firmware update request may further include: a running version parameter of the first server node. First version release behavior information is obtained from historical version release behavior information associated with the firmware version release record, the first version release behavior information is version release behavior information having a latest version release timestamp in the historical version release behavior information; and it is determined that the firmware update request is a valid update request when the first version release behavior information includes the updated version parameter. In one embodiment of the present disclosure, in response to detecting that that the first version release behavior information does not include the updated version parameter, and second version release behavior information in the historical version release behavior information includes the updated version parameter, M second server nodes on which firmware update has been performed by using the updated version parameter are searched for from the blockchain, M being a positive integer greater than 2. Further, version update behavior information of the M second server nodes is obtained. When the version update behavior information of the M second server nodes includes the running version parameter, it is determined that the firmware update request is the valid update request. In one embodiment of the present disclosure, when the version update behavior information of the M second server nodes does not include version update behavior information of the running version parameter, it is determined that the firmware update request is the invalid update request.

Figure 6:
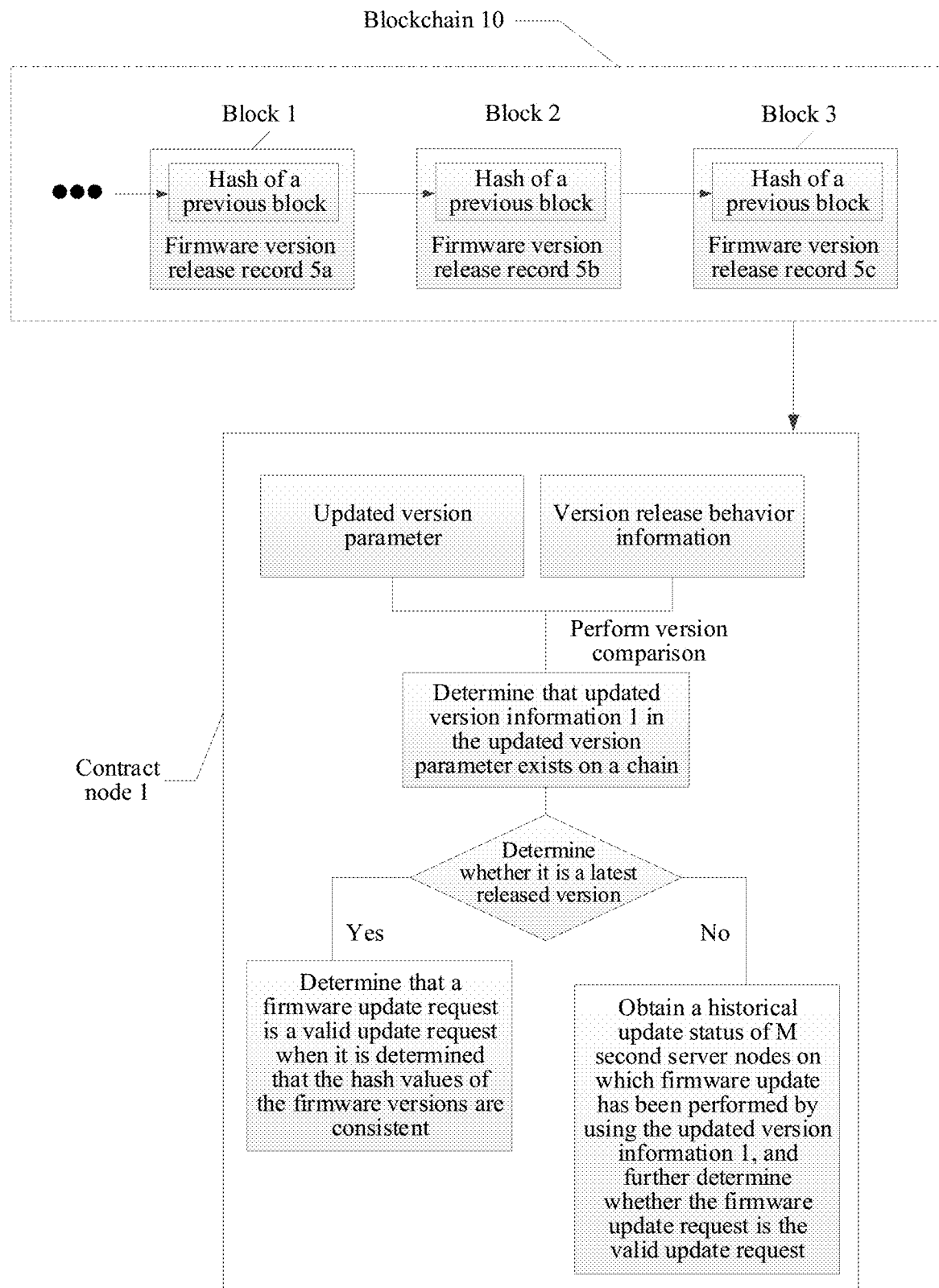
FIG. 6 is a schematic diagram of obtaining version release behavior information according to an embodiment of the present disclosure.

For ease of understanding, further, FIG. 6 is a schematic diagram of obtaining version release behavior information according to an embodiment of the present disclosure. As shown in FIG. 6, the contract node 1 may obtain version release behavior information of the firmware K from a blockchain shown in FIG. 6, and the version release behavior information may include first version release behavior information and second version release behavior information. It is to be understood that, updated version information 1 in an updated version parameter is compared with firmware version release information in all version release behavior information, to quickly determine whether the updated version information 1 shown in FIG. 6 exists on the chain. If it is determined that the updated version information 1 exists on the chain, it may further be determined whether the updated version information 1 is latest released firmware version release information. It is to be understood that if the version on which an update is requested is a latest version, a hash value of the updated version information may be directly compared with a hash value of the latest released firmware version release information. If the hash value of the updated version information is the same as the hash value of the latest released firmware version release information, that is, it is determined that the hash values of the firmware versions are consistent, it may be determined, through contract detection, that the firmware update request transmitted by the execution node in step S201 is the valid update request. In one embodiment of the present disclosure, if the hash value of the updated version information is different from the hash value of the latest released firmware version release information, it is determined that contract detection fails, thereby turning to perform step S207 and step S208.

The first version release behavior information is a latest release status that is of the firmware K and that is found by the contract node 1 from the blockchain based on the blockchain address of the first server node. In this case, the first version release behavior information may be version release behavior information having a latest version release timestamp in historical version release behavior information of the firmware K. Therefore, in one embodiment of the present disclosure, whether a version (that is, the updated version information 1) that the execution node requests to update is the latest version may be quickly determined by using the first version release behavior information.

It is to be understood that, as shown in FIG. 6, when it is determined that the version on which an update is requested is not the latest version, M other server nodes on which firmware update has been performed by using the updated version information 1 may be obtained, and each of the M other server nodes may be referred to as a second server node. In this case, the contract node may separately query a blockchain network shown in FIG. 6, based on a blockchain address of each second server node, for a firmware version update record associated with a corresponding second server node, that is, version update behavior information of M second server nodes may be obtained.

It is to be understood that in response to detecting that that the version update behavior information of the M second server nodes includes the running version parameter, it is determined that the firmware update request is the valid update request. That is, when determining that M second server nodes have updated the firmware K in this firmware update manner, the contract node may allow the execution node to perform firmware update on the firmware K in the first server node in the same firmware update manner. For example, when the M second server nodes are updated from currently running first firmware version information to second firmware version information on which an update is requested, the execution node may update the firmware version information of the firmware K of the first server node from the first firmware version information to second firmware version information.

In view of this, in one embodiment of the present disclosure, in an intranet environment of the same enterprise, an illegal attacker may trap a small number of machines (that is, the first server node) and further perform an update operation on firmware in the first server node. However, an update operation for the first server node is compared with an update behavior of most (that is, M) other machines (that is, the second server node) in the firmware update manner, and the update operation may be effectively considered as an invalid operation when it is determined that the update operation for the first server node is inconsistent with the update behavior of the most other machines. Therefore, the first server node corresponding to the invalid operation may be quickly determined as an abnormal node in a large-scale server cluster.

It can be learned that, as shown in FIG. 5, after performing step S205, the contract node may further perform step S206 in a case in which it is determined that the firmware update request is the valid update request. In one embodiment of the present disclosure, the contract node may further perform step S207 and step S208 when determining that the firmware update request is the invalid update request.

Step S206. Return, in response to determining that the firmware update request is the valid update request, feedback information used for performing firmware update on the first server node to the execution node, the feedback information being used for instructing the execution node to update firmware version information of the first server node from running version information in the running version parameter to updated version information in the updated version parameter.

Step S207. Determine, in response to detecting that that the firmware update request is the invalid update request, that execution of a contract fails, and return the invalid update request to the execution node.

Step S208. Identify, when a next firmware update request transmitted by the execution node for the first server node is received, the next firmware update request as the invalid update request, the invalid update request being used for instructing the release node to generate alarm information for the execution node during security audit.

In one embodiment of the present disclosure, after performing step S206, the contract node may further perform the following steps: receiving confirmation information obtained after the first server node signs the updated version parameter, the confirmation information being used for indicating that the execution node has updated firmware version information of the first server node; performing signature verification on the confirmation information by using public key information of the first server node, and determining, when the signature verification succeeds, that invoking of the intelligent contract is completed; and updating the firmware version update record of the first server node based on the confirmation information and the firmware update request, and writing an updated firmware version update record into the blockchain based on a blockchain address of the first server node.

Figure 7:
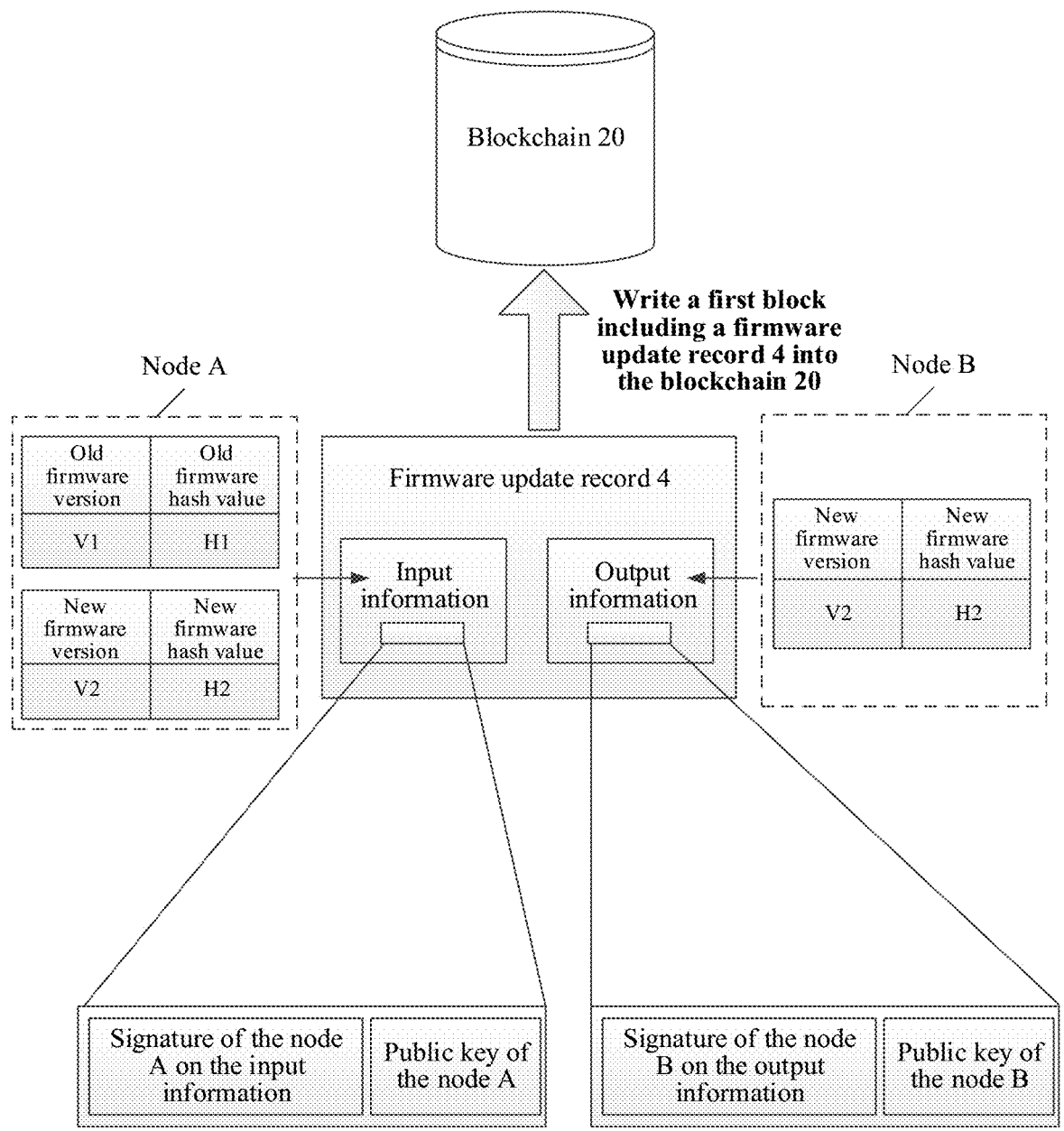
FIG. 7 is a schematic diagram of constructing a firmware version update record according to an embodiment of the present disclosure.

For ease of understanding, further, FIG. 7 is a schematic diagram of constructing a firmware version update record according to an embodiment of the present disclosure. As shown in FIG. 7, a firmware version update record 4 is formed by input information and output information. As shown in FIG. 7, the input information may be a running version parameter and an updated version parameter provided by a node A involved in a process of executing an intelligent contract by the contract node. Therefore, before the execution node A transmits a firmware update request to the contract node, the execution node A needs to provide an updated version parameter currently planned to update firmware of a first server node and a running version parameter currently run by the first server node. In this case, the first server node may refer to a running version parameter (that is, an old firmware version V1 and an old firmware hash value H1 that are shown in FIG. 7) and an updated version parameter (that is, a new firmware version V2 and a new firmware hash value H2 that are shown in FIG. 7) of firmware K as the input information. In one embodiment of the present disclosure, when obtaining input information, the execution node A may sign the input information by using a private key of the execution node A, to obtain first signature information, add a public key of the execution node A together with the first signature information obtained after signing by the execution node A to the firmware update request, and transmits the firmware update request to the contract node. Therefore, in a process of invoking an intelligent contract, the contract node may perform signature verification on the first signature information by using the public key of the execution node A, to obtain the input parameter (that is, the input information) from the firmware update request, that is, the updated version parameter and the running version parameter of the firmware K may be obtained.

As shown in FIG. 7, the output information may include a new running version parameter acquired and reported by a server node B (that is, the first server node), and the new running version parameter may be obtained by performing firmware update on the running version parameter by using the updated version parameter. In this case, new running version information run in the first server node may be an updated version parameter of which a new firmware version is V2 and a new firmware hash value is H2 shown in FIG. 7. As shown in FIG. 7, before sending confirmation information to the contract node, the first server node may use the currently acquired new running version parameter as output information, sign the output information by using a private key of the server node B, to obtain second signature information, add the second signature information together with a public key of the server node B to the confirmation information, and send the confirmation information to the contract node. Therefore, after receiving the confirmation information sent by the server node B, the contract node may perform signature verification on the confirmation information by using the public key of the server node B, to obtain the output information provided by the server node B. that is, the new running version parameter provided by the server node B may be obtained.

Further, the contract node may determine, based on the input information and the output information shown in FIG. 7, target version update behavior information associated with the first server node, and update the firmware version update record of the first server node based on the target version update behavior information. That is, as shown in FIG. 7, the contract node may generate the firmware version update record 4 shown in FIG. 7 according to the input information, signature of the execution node A on the input information, the public key of the execution node A, the output information, signature of the server node B on the output information, and the public key of the server node B, and write the firmware version update record 4 into a blockchain 20 shown in FIG. 7. In one embodiment of the present disclosure, the blockchain 20 shown in FIG. 7 and the blockchain 10 in the foregoing embodiment corresponding to FIG. 6 may belong to the same blockchain network, and this is not limited herein.

In one embodiment of the present disclosure, for ease of understanding, a block (that is, a block N+3) including the firmware version update record 4 may be added after the block N+2 based on the structure of the nested hash chain shown in FIG. 3. The contract node may calculate a hash value of the firmware version update record 4. If there is no update operation on another firmware in the first server node in this period of time after the block N+2 is generated and before the block N+3 is generated, a hash value of the firmware version update record 4 may be used as a Merkle tree root of the block N+3, and a hash value of a previous block may be used as a parent block hash value in a block header of the block N+3, so that the block N+3 may be written into the same blockchain after the block N+2. In one embodiment of the present disclosure, when a new block is generated, the newly generated block still needs to be broadcast on an entire network, so that another node may find the new block and determine, after a consensus is reached, that the block N+3 is written into a blockchain in which the block N+2 is located, to perform sequential storage.

Figure 8:
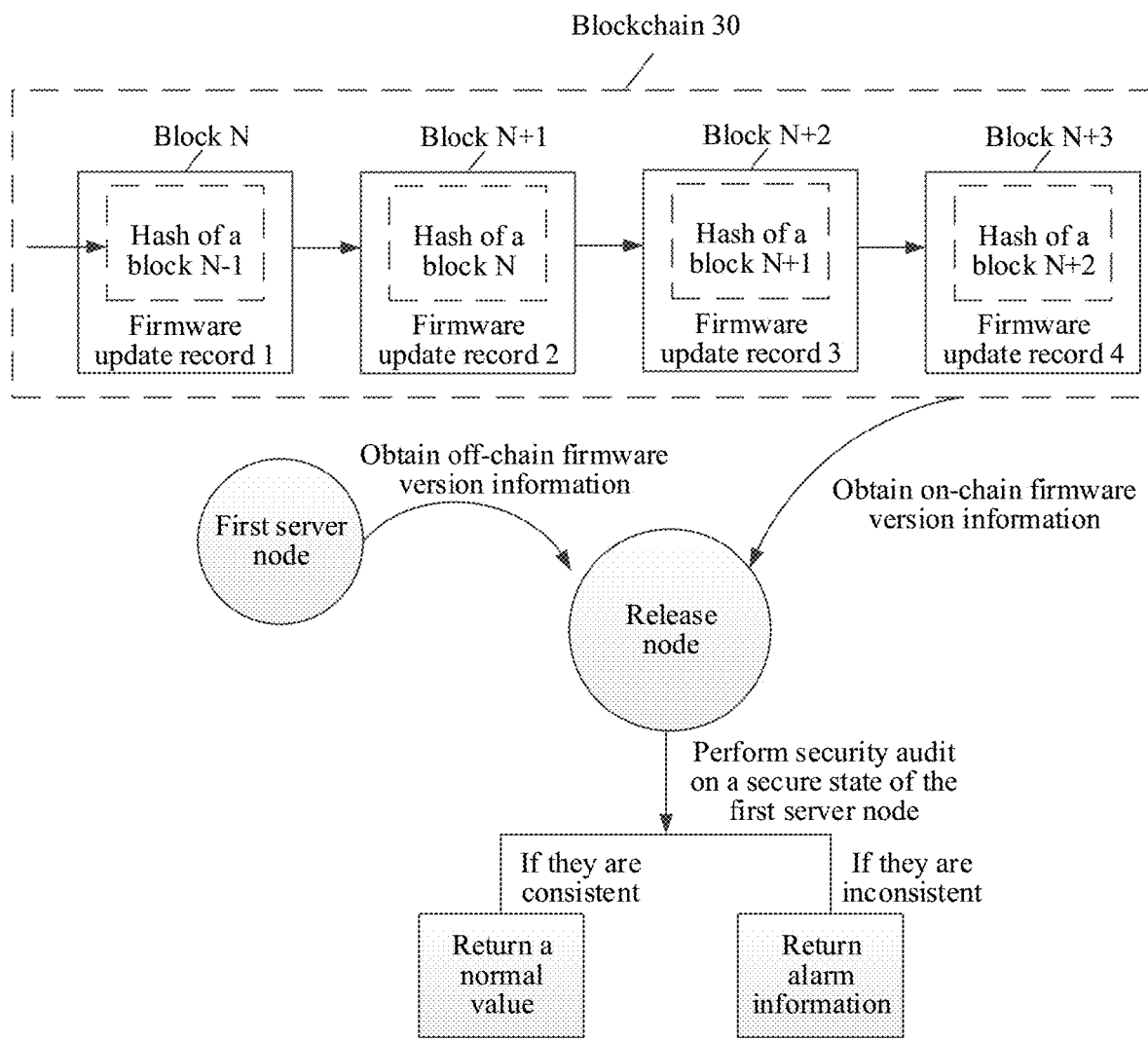
FIG. 8 is a schematic diagram of performing security audit by using a release node according to an embodiment of the present disclosure.

For ease of understanding, further, FIG. 8 is a schematic diagram of performing security audit by using a release node according to an embodiment of the present disclosure. A blockchain 30 shown in FIG. 8 may be a blockchain formed by writing the block N+3 including the firmware version update record 4 shown in FIG. 7 into the nested hash chain in the foregoing embodiment corresponding to FIG. 3.

In one embodiment of the present disclosure, all update results (that is, the firmware version update record 4) are recorded on the blockchain, and a distributed data reference that cannot be tampered with and that is not easily lost may be provided for subsequent audit in a secure state, thereby implementing audit on the secure state of any machine. During audit on a secure state, a release node may automatically acquire and analyze firmware data read from an audited machine, and quickly give an alarm on abnormality when determining that on-chain firmware information is inconsistent with off-chain firmware information, thereby effectively improving a capability of sensing an advanced threat intrusion means and significantly increasing security of an enterprise intranet.

In one embodiment of the present disclosure, after an execution node completes an update operation on firmware in a first server node, another node (for example, an acquisition node) on the blockchain may also be configured to continuously acquire firmware information in the first server node off a chain. An acquisition frequency may be that acquisition of the firmware information of the first server node is started each time the first server node is restarted. Alternatively, in one embodiment of the present disclosure, acquisition of the firmware information of the first server node may be started regularly or periodically. The acquisition manner is not limited to use of an automatic acquisition and analysis tool (for example, a uniform extensible firmware interface tool). The release node may perform security audit on a secure state of any server node located on the blockchain, to determine the secure states of the server nodes by comparing on-chain firmware information of the server nodes with off-chain firmware information of the server nodes.

For ease of understanding, in one embodiment of the present disclosure, one server node (that is, the server node 40a in the foregoing embodiment corresponding to FIG. 1 is used as a first server node) in the server nodes is used as an example, to describe a specific implementation process in which the release node performs security audit on the server node 40a (that is, the first server node). In one embodiment of the present disclosure, alternatively, the release node may regularly or periodically read firmware information currently run in the server node 40a from the server node 40a, and refer to the currently read firmware information as off-chain firmware information.

It is to be understood that, for an acquisition node, the acquisition node may also regularly or periodically transmit the firmware information read from the server node 40a (that is, the first server node) back to a data middle platform, and then the data middle platform may transmit the read firmware information to a background, so that the read firmware information may be screened and filtered at the background, to obtain off-chain firmware information of the first server node. In this way, when subsequently needing to perform security audit on a secure state of the first server node, the release node may obtain the off-chain firmware information of the first server node from the background.

In addition, the release node may further obtain a latest update status from the blockchain based on a blockchain address of the first server node, that is, may find a latest firmware version update record obtained after firmware update is performed on firmware in the first server node (that is, a firmware version update record 4 located in the block N+3 having a latest timestamp, i.e., a maximum record number, shown in FIG. 8), so that firmware information (that is, on-chain firmware information) of the first server node recorded in the firmware version update record 4 may be used as a comparison reference for the off-chain firmware information. Therefore, when it is determined that the off-chain firmware information is consistent with the on-chain firmware information, it may be determined that current security audit on the first server node succeeds, so that a normal value may be returned to a user or a terminal to which the first server node belongs. In one embodiment of the present disclosure, if it is determined through comparison that the off-chain firmware information is inconsistent with the on-chain firmware information after comparison, it indicates that an integrity state of firmware of the first server node is abnormal. In this case, alarm information is returned to an administrator or a user to which the first server node belongs in a manner of mobile terminal or web terminal alarm information (also referred to as worksheet information).

The worksheet information (that is, the alarm information) may include, but not limited to: (1) an event time (that is, a time of performing security audit on the first server node); (2) service information, for example, a person in charge of a machine, a belonging area, a belonging service, a corresponding IP, and a corresponding public key; (3) a reported firmware version and firmware hash; (4) machine information recorded on a chain, for example, a public key of a machine, a firmware version, and a firmware hash; (5) a previously updated event, including an update time, information about an update executor, and the like.

It is to be understood that if it is determined that the worksheet information is in a dangerous state of being intruded, an emergency response process may be started. For example, network isolation may be performed on an abnormal machine and detailed security audit may be further performed.

In one embodiment of the present disclosure, when receiving a firmware update request transmitted by the execution node for the first server node, a first terminal may invoke an intelligent contract to perform intelligent update management control on the firmware update request initiated by the execution node, thereby ensuring security of firmware update. The firmware update request may carry an updated version parameter planned to update firmware of the first server node. Further, the contract node may obtain, from a blockchain, a firmware version update record and a firmware version release record that are associated with the first server node, to perform contract detection on the updated version parameter in the firmware update request based on the obtained firmware version update record and firmware version release record, and determine that the firmware update request meeting a contract detection result is a valid update request. Otherwise, it may be determined that the firmware update request that does not meet the contract detection result is an invalid update request. It can be learned that, for all update operations performed by the contract node on firmware at a bottom level of the first server node, a valid firmware update operation or an invalid firmware update operation may be effectively distinguished by using the intelligent contract, to improve reliability of firmware update.

Figure 9:
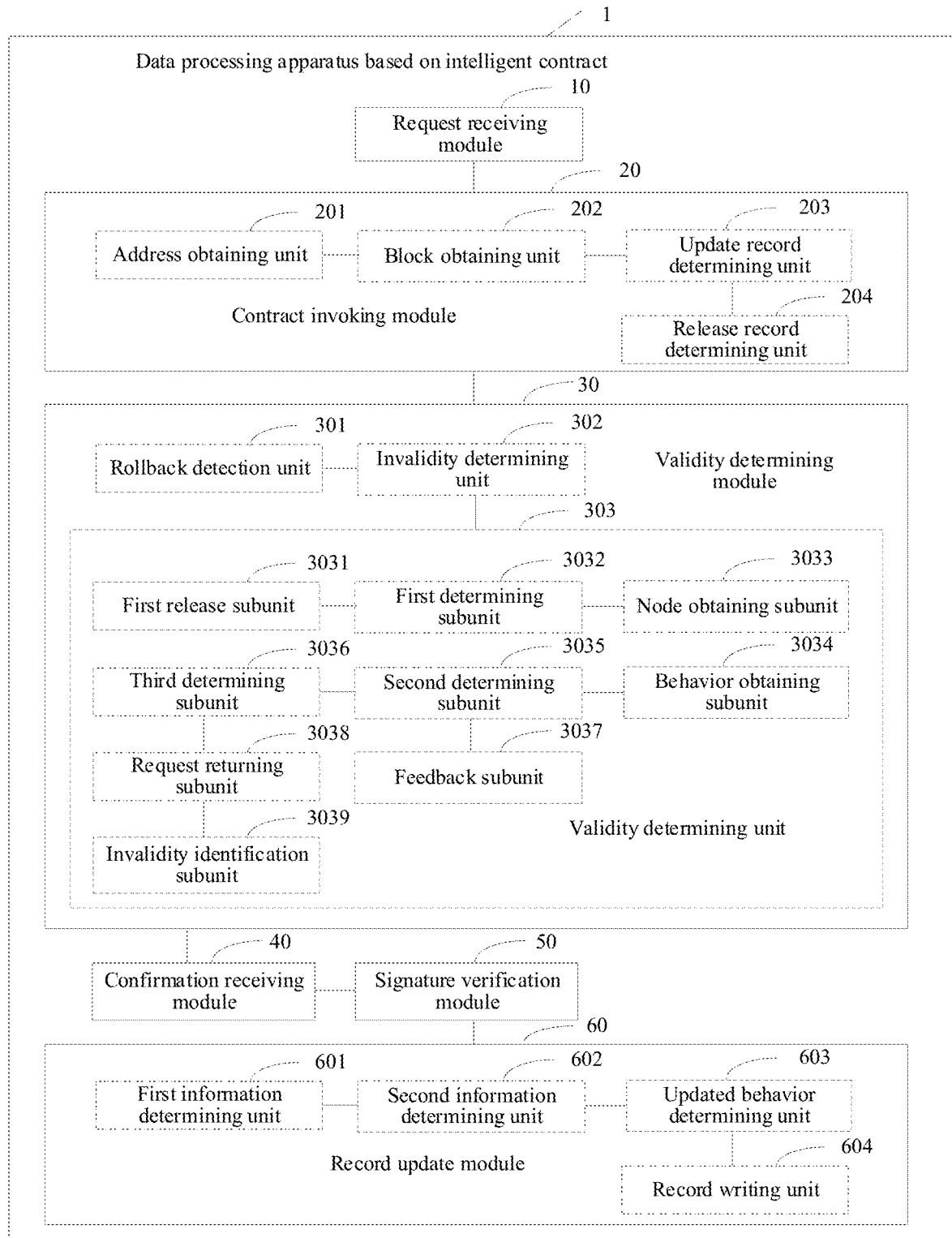
FIG. 9 is a schematic structural diagram of a data processing apparatus based on an intelligent contract according to an embodiment of the present disclosure.

Further, FIG. 9 is a schematic structural diagram of a data processing apparatus based on an intelligent contract according to an embodiment of the present disclosure. The data processing apparatus 1 may be applied to the contract node 20a in the foregoing embodiment corresponding to FIG. 1. As shown in FIG. 9, the data processing apparatus 1 may include: a request receiving module 10, a contract invoking module 20, and a validity determining module 30. The data processing apparatus 1 may further include: a confirmation receiving module 40, a signature verification module 50, and a record update module 60.

The request receiving module 10 is configured to receive a firmware update request corresponding to a first server node transmitted by an execution node, the firmware update request including at least an updated version parameter of the first server node.

The contract invoking module 20 is configured to invoke an intelligent contract according to the firmware update request, and obtain, from a blockchain based on the intelligent contract, a firmware version update record and a firmware version release record that are associated with the first server node, the firmware version release record being determined by a release node on the blockchain based on a consensus mechanism.

The contract invoking module 20 includes an address obtaining unit 201, a block obtaining unit 202, an update record determining unit 203, and a release record determining unit 204.

The address obtaining unit 201 is configured to invoke the intelligent contract to obtain a blockchain address of the first server node in the blockchain, the blockchain address being uniquely determined by the blockchain after hash calculation is performed according to public key information of the first server node.

The block obtaining unit 202 is configured to obtain, based on the blockchain address from the blockchain, a first block and a second block that are associated with the first server node.

The update record determining unit 203 is configured to determine, historical version update behavior information from the first block as the firmware version update record associated with the first server node, the historical version update behavior information carrying a first version parameter and a second version parameter, and the second version parameter being a version parameter obtained after firmware update is performed on the first version parameter.

The release record determining unit 204 is configured to determine that the firmware version release record is historical version release behavior information associated with the first server node from the second block.

For the specific implementation of the address obtaining unit 201, the block obtaining unit 202, the update record determining unit 203, and the release record determining unit 204, reference may be made to the description about step S102 in the embodiment corresponding to FIG. 2, and details are not described herein again.

The validity determining module 30 is configured to determine validity of the firmware update request according to the firmware version update record, the firmware version release record, and the updated version parameter.

The validity determining module 30 includes a rollback detection unit 301, an invalidity determining unit 302, and a validity determining unit 303.

The rollback detection unit 301 is configured to perform rollback detection on the updated version parameter based on the first version parameter in the firmware version update record.

The invalidity determining unit 302 is configured to determine, in response to detecting that that the first version parameter is the same as the updated version parameter, that version rollback exists, and determine that the firmware update request is an invalid update request, the invalid update request being used for indicating that the execution node does not have permission to perform firmware update on version information of the first server node.

The validity determining unit 303 is configured to determine, in response to detecting that that the first version parameter is different from the updated version parameter, that the version rollback does not exist, and determine the validity of the firmware update request based on the updated version parameter and the firmware version release record.

The firmware update request further includes a running version parameter of the first server node.

The validity determining unit 303 includes: a first release subunit 3031 and a first determining subunit 3032. The validity determining unit further includes a node obtaining subunit 3033, a behavior obtaining subunit 3034, a second determining subunit 3035, a third determining subunit 3036, a feedback subunit 3037, a request returning subunit 3038, and an invalidity identification subunit 3039.

The first release subunit 3031 is configured to obtain first version release behavior information from historical version release behavior information associated with the firmware version release record, the first version release behavior information being version release behavior information having a latest version release timestamp in the historical version release behavior information.

The first determining subunit 3032 is configured to determine that the firmware update request is the valid update request in response to detecting that that the first version release behavior information includes the updated version parameter.

In one embodiment of the present disclosure, the node obtaining subunit 3033 is configured to search, in response to detecting that that the first version release behavior information does not include the updated version parameter, and second version release behavior information in the historical version release behavior information includes the updated version parameter, the blockchain for M second server nodes on which firmware update is performed by using the updated version parameter, M being a positive integer greater than 2.

The behavior obtaining subunit 3034 is configured to obtain version update behavior information of the M second server nodes.

The second determining subunit 3035 is configured to determine that the firmware update request is the valid update request in response to detecting that that the version update behavior information of the M second server nodes includes the running version parameter.

The third determining subunit 3036 is configured to determine that the firmware update request is the invalid update request in response to detecting that that version update behavior information that does not include the running version parameter exists in the version update behavior information of the M second server nodes.

In one embodiment of the present disclosure, the feedback subunit 3037 is configured to return, in response to determining that the firmware update request is the valid update request, feedback information used for performing firmware update on the first server node to the execution node, the feedback information being used for instructing the execution node to update firmware version information of the first server node from running version information in the running version parameter to updated version information in the updated version parameter.

In one embodiment of the present disclosure, the request returning subunit 3038 is configured to determine, in response to detecting that that the firmware update request is the invalid update request, that execution of a contract fails, and return the invalid update request to the execution node.

The invalidity identification subunit 3039 is configured to identify, when a next firmware update request transmitted by the execution node for the first server node is received, the next firmware update request as the invalid update request, the invalid update request being used for instructing the release node to generate alarm information for the execution node during security audit.

The alarm information is obtained by the release node after the security audit is performed according to an on-chain updated version parameter of the first server node obtained from the blockchain and an updated running version parameter that is locally acquired from the first server node.

For the specific implementation of the first release subunit 3031, the first determining subunit 3032, the node obtaining subunit 3033, the behavior obtaining subunit 3034, the second determining subunit 3035, the third determining subunit 3036, the feedback subunit 3037, the request returning subunit 3038, and the invalidity identification subunit 3039, reference may be made to the description about step S103 in the embodiment corresponding to FIG. 2, and details are not described herein again.

For the specific implementation of the rollback detection unit 301, the invalidity determining unit 302, the validity determining unit 303, reference may be made to the description about step S103 in the embodiment corresponding to FIG. 2, and details are not described herein again.

In one embodiment of the present disclosure, the confirmation receiving module 40 is configured to receive confirmation information after the first server node signs the updated version parameter, the confirmation information being used for indicating that the execution node has updated firmware version information of the first server node.

The signature verification module 50 is configured to perform signature verification on the confirmation information by using public key information of the first server node, and determine, when the signature verification succeeds, that invoking of the intelligent contract is completed.

The record update module 60 is configured to update the firmware version update record of the first server node based on the confirmation information and the firmware update request, and write an updated firmware version update record into the blockchain based on a blockchain address of the first server node.

The record update module 60 includes: a first information determining unit 601, a second information determining unit 602, an updated behavior determining unit 603, and a record writing unit 604.

The first information determining unit 601 is configured to use the updated version parameter and a running version parameter that are in the firmware update request as input information for constructing the firmware version update record associated with the first server node.

The second information determining unit 602 is configured to use the updated version parameter carried in the confirmation information as output information for constructing the firmware version update record associated with the first server node.

The updated behavior determining unit 603 is configured to determine, based on the input information and the output information, target version update behavior information associated with the first server node, and update the firmware version update record of the first server node based on the target version update behavior information.

The record writing unit 604 is configured to write the updated firmware version update record into the blockchain based on the blockchain address of the first server node.

For the specific implementation of the first information determining unit 601, the second information determining unit 602, the updated behavior determining unit 603, and the record writing unit 604, reference may be made to the description of the firmware version update record in the embodiment corresponding to FIG. 2, and details are not described herein again.

For the specific implementation of the request receiving module 10, the contract invoking module 20, and the validity determining module 30, reference may be made to the description about step S101 to step S103 in the embodiment corresponding to FIG. 2, and details are not described herein again. In one embodiment of the present disclosure, for the specific implementation of the confirmation receiving module 40, the signature verification module 50, and the record update module 60, reference may be made to the description about step S201 to step S208 in the embodiment corresponding to FIG. 5, and details are not described herein again.

Each module/unit in various disclosed embodiments can be integrated in a processing unit, or each module/unit can exist separately and physically, or two or more modules/units can be integrated in one unit. The modules/units as disclosed herein can be implemented in the form of hardware (e.g., processing circuitry and/or memory) or in the form of software functional unit(s) (e.g., developed using one or more computer programming languages), or a combination of hardware and software.

In one embodiment of the present disclosure, when receiving a firmware update request transmitted by the execution node for the first server node, a first terminal may invoke an intelligent contract to perform intelligent update management control on the firmware update request initiated by the execution node, thereby ensuring security of firmware update. The firmware update request may carry an updated version parameter planned to update firmware of the first server node. Further, the contract node may obtain, from a blockchain, a firmware version update record and a firmware version release record that are associated with the first server node, to perform contract detection on the updated version parameter in the firmware update request based on the obtained firmware version update record and firmware version release record, and determine that the firmware update request meeting a contract detection result is a valid update request. Otherwise, it may be determined that the firmware update request that does not meet the contract detection result is an invalid update request. It can be learned that, for all update operations performed by the contract node on firmware at a bottom level of the first server node, a valid firmware update operation or an invalid firmware update operation may be effectively distinguished by using the intelligent contract, to improve reliability of firmware update.

Figure 10:
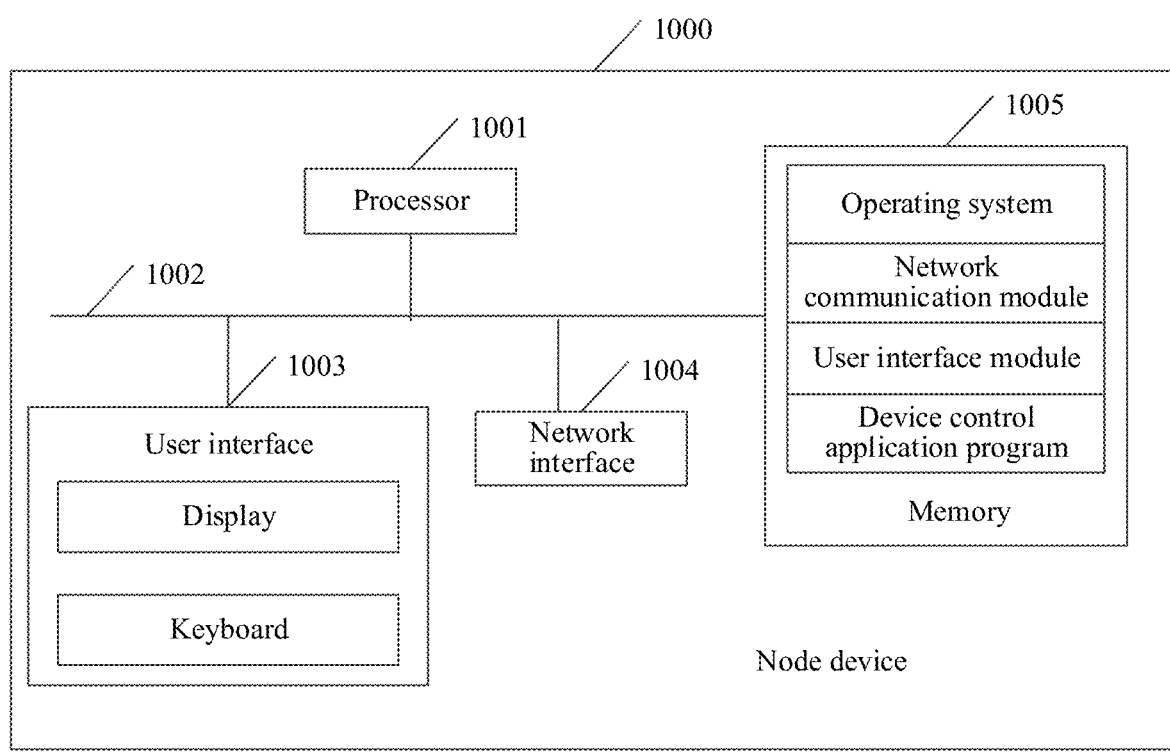
FIG. 10 is a schematic structural diagram of a node device according to an embodiment of the present disclosure.

Further, FIG. 10 is a schematic structural diagram of a node device according to an embodiment of the present disclosure. As shown in FIG. 10, the node device 1000 may be applied to the contract node 20a in the foregoing embodiment corresponding FIG. 1 and the node device 1000 may include: a processor 1001, a network interface 1004, and a memory 1005, as well as a user interface 1003 and at least one communication bus 1002. The communication bus 1002 is configured to implement connection and communication between the components. The user interface 1003 may include a display and a keyboard. The user interface 1003 may further include a standard wired interface or wireless interface. In one embodiment of the present disclosure, the network interface 1004 may include a standard wired interface or wireless interface (for example, a Wi-Fi interface). The memory 1005 may be a high-speed RAM, or may be a non-volatile memory, for example, at least one magnetic disk memory. In one embodiment of the present disclosure, the memory 1005 may alternatively be at least one storage device located away from the processor 1001. As shown in FIG. 10, the memory 1005 used as a computer storage medium may include an operating system, a network communication module, a user interface module, and a device-control application program.

The network interface 1004 in the node device 1000 may further be connected to another node device (for example, an application server) in a blockchain, and the user interface 1003 may further include a display and a keyboard. In the node device 1000 shown in FIG. 10, the network interface 1004 may provide a network communication function. The user interface 1003 is mainly configured to provide an input interface for a user. The processor 1001 may be configured to call the application program stored in the memory 1005, to implement the following operations:

receiving a firmware update request corresponding to a first server node transmitted by an execution node, the firmware update request including at least an updated version parameter of the first server node;

invoking an intelligent contract according to the firmware update request, and obtaining, from a blockchain based on the intelligent contract, a firmware version update record and a firmware version release record that are associated with the first server node, the firmware version release record being determined by a release node on the blockchain based on a consensus mechanism; and determining validity of the firmware update request according to the firmware version update record, the firmware version release record, and the updated version parameter.

It is to be understood that, the node device 1000 described in one embodiment of the present disclosure can implement the descriptions of the data processing method based on an intelligent contract in the foregoing corresponding embodiments, and can also implement the descriptions of the data processing apparatus 1 based on an intelligent contract in the foregoing corresponding embodiment. Details are not described herein again. In addition, beneficial effects achieved by using the same method are not described herein again.

In addition, an embodiment of the present disclosure further provides a computer storage medium. The computer storage medium stores a computer program executed by the data processing apparatus 1 based on an intelligent contract mentioned above, and the computer program includes program instructions. When executing the program instructions, the processor can implement the descriptions of the data processing method based on an intelligent contract in the foregoing corresponding embodiments. Therefore, details are not described herein again. In addition, beneficial effects achieved by using the same method are not described herein again. For technical details that are not disclosed in the embodiment of the computer storage medium of the present disclosure, refer to the descriptions of the method embodiments of the present disclosure.

A person of ordinary skill in the art may understand that all or some of the processes of the methods in the foregoing embodiments may be implemented by a computer program instructing relevant hardware. The program may be stored in a computer-readable storage medium. During execution of the program, processes of the foregoing method embodiments may be included. The foregoing storage medium may be a magnetic disk, an optical disc, a read-only memory (ROM), a random access memory (RAM), or the like.

What are disclosed above are merely examples of embodiments of the present disclosure, and certainly are not intended to limit the protection scope of the present disclosure. Therefore, equivalent variations made in accordance with the claims of the present disclosure shall fall within the scope of the present disclosure.

What is claimed is:

1. A data processing method based on an intelligent contract, performed by an electronic device as a contract node, the method comprising:

receiving a firmware update request corresponding to a first server node transmitted by an execution node, the firmware update request comprising an updated version parameter of the first server node;

invoking an intelligent contract according to the firmware update request;

obtaining, from a blockchain based on the intelligent contract, a firmware version update record and a firmware version release record that are associated with the first server node, wherein the firmware version release record is determined by a release node on the blockchain based on a consensus mechanism, and the firmware version update record includes a first version parameter and a second version parameter, and the second version parameter being a version parameter obtained after a firmware update is performed on the first version parameter; and determining validity of the firmware update request according to the firmware version update record, the firmware version release record, and the updated version parameter, comprising:
  comparing the updated version parameter with the first version parameter in the firmware version update record;
  determining, in response to detecting that the first version parameter is the same as the updated version parameter, that the firmware update request is an invalid update request, the invalid update request indicating that the execution node does not have permission to update firmware version information of the first server node; and
  determining, in response to detecting that the first version parameter is different from the updated version parameter, the validity of the firmware update request based on the updated version parameter and the firmware version release record.

2. The method according to claim 1, wherein the invoking an intelligent contract, and obtaining, from a blockchain, a firmware version update record and a firmware version release record that are associated with the first server node comprises:
  invoking the intelligent contract to obtain a blockchain address of the first server node in the blockchain, the blockchain address being uniquely determined by the blockchain after hash calculation according to public key information of the first server node;
  obtaining, based on the blockchain address from the blockchain, a first block and a second block that are associated with the first server node;
  determining historical version update behavior information from the first block as the firmware version update record associated with the first server node, the historical version update behavior information carrying the first version parameter and the second version parameter; and
  determining historical version release behavior information associated with the first server node from the second block as the firmware version release record.

3. The method according to claim 2, wherein the determining, in response to detecting that the first version parameter is different from the updated version parameter, the validity of the firmware update request based on the updated version parameter and the firmware version release record comprises:
  obtaining first version release behavior information from the historical version release behavior information associated with the firmware version release record, the first version release behavior information being version release behavior information having a latest version release timestamp in the historical version release behavior information;
  detecting whether the first version release behavior information comprises the updated version parameter;
  determining that the firmware update request is the valid update request in response to detecting that the first version release behavior information comprises the updated version parameter; and
  determining, in response to detecting that the first version release behavior information does not comprise the updated version parameter, the validity of the firmware update request based on second version release behavior information in the historical version release behavior information.

4. The method according to claim 3, wherein the firmware update request further comprises a running version parameter of the first server node; and the determining, in response to detecting that the first version release behavior information does not comprise the updated version parameter, the validity of the firmware update request based on the second version release behavior information in the historical version release behavior information comprises:
  searching, in response to detecting that the first version release behavior information does not comprise the updated version parameter, and in response to the second version release behavior information in the historical version release behavior information comprises the updated version parameter, the blockchain for M second server nodes on which firmware update is performed by using the updated version parameter, M being a positive integer greater than 2;
  obtaining version update behavior information of the M second server nodes;
  determining that the firmware update request is the valid update request in response to detecting that all the version update behavior information of the M second server nodes comprises the running version parameter; and
  determining that the firmware update request is the invalid update request in response to detecting that at least one version update behavior information in the version update behavior information of the M second server nodes does not comprise the running version parameter.

5. The method according to claim 1, further comprising:
  returning to the execution node, in response to determining that the firmware update request is the valid update request, feedback information about performing a firmware update on the first server node, the feedback information being used for instructing the execution node to update the firmware version information of the first server node from running version information in the running version parameter to updated version information in the updated version parameter.

6. The method according to claim 1, further comprising:
  determining, in response to detecting that the firmware update request is the invalid update request, that execution of the intelligent contract fails, and returning the invalid update request to the execution node; and
  identifying, when a next firmware update request corresponding to the first server node transmitted by the execution node is received, the next firmware update request as the invalid update request, the invalid update request being used for instructing the release node to generate alarm information for the execution node during security audit.

7. The method according to claim 6, wherein the alarm information is obtained by the release node after the security audit is performed according to: an on-chain updated version parameter of the first server node obtained from the blockchain and an updated running version parameter locally acquired from the first server node.

8. The method according to claim 1, further comprising:
  receiving confirmation information after the first server node signs the updated version parameter, the confirmation information indicating that the execution node has updated firmware version information of the first server node;
  performing signature verification on the confirmation information by using public key information of the first server node;
  determining, when the signature verification succeeds, that the invoking of the intelligent contract is completed; and updating the firmware version update record of the first server node based on the confirmation information and the firmware update request, and writing an updated firmware version update record into the blockchain based on a blockchain address of the first server node.

9. The method according to claim 8, wherein the updating the firmware version update record of the first server node based on the confirmation information and the firmware update request, and writing an updated firmware version update record into the blockchain based on a blockchain address of the first server node comprises:
using the updated version parameter and a running version parameter in the firmware update request as input information for constructing the firmware version update record associated with the first server node;
using the updated version parameter carried in the confirmation information as output information for constructing the firmware version update record associated with the first server node;
determining, based on the input information and the output information, target version update behavior information associated with the first server node;
updating the firmware version update record of the first server node based on the target version update behavior information; and
writing the updated firmware version update record into the blockchain based on the blockchain address of the first server node.

10. A data processing apparatus based on an intelligent contract, applied to a contract node, and the apparatus comprising: a memory and a processor coupled to the memory, the memory being configured to store program code, and the processor being configured to execute the program code to perform:
receiving a firmware update request corresponding to a first server node transmitted by an execution node for a first server node, the firmware update request comprising an updated version parameter of the first server node;
invoking an intelligent contract according to the firmware update request;
obtaining, from a blockchain based on the intelligent contract, a firmware version update record and a firmware version release record that are associated with the first server node, wherein the firmware version release record is determined by a release node on the blockchain based on a consensus mechanism, and the firmware version update record includes a first version parameter and a second version parameter, and the second version parameter being a version parameter obtained after a firmware update is performed on the first version parameter; and
determining validity of the firmware update request according to the firmware version update record, the firmware version release record, and the updated version parameter, comprising:
comparing the updated version parameter with the first version parameter in the firmware version update record;
determining, in response to detecting that the first version parameter is the same as the updated version parameter, that the firmware update request is an invalid update request, the invalid update request indicating that the execution node does not have permission to update firmware version information of the first server node; and
determining, in response to detecting that the first version parameter is different from the updated version parameter, the validity of the firmware update request based on the updated version parameter and the firmware version release record.

11. The apparatus according to claim 10, wherein the invoking an intelligent contract, and obtaining, from a blockchain, a firmware version update record and a firmware version release record that are associated with the first server node comprises:
invoking the intelligent contract to obtain a blockchain address of the first server node in the blockchain, the blockchain address being uniquely determined by the blockchain after hash calculation according to public key information of the first server node;
obtain, based on the blockchain address from the blockchain, a first block and a second block that are associated with the first server node;
determining historical version update behavior information from the first block as the firmware version update record associated with the first server node, the historical version update behavior information carrying the first version parameter and the second version parameter; and
determining historical version release behavior information associated with the first server node from the second block as the firmware version release record.

12. The apparatus according to claim 11, wherein the determining, in response to detecting that the first version parameter is different from the updated version parameter, the validity of the firmware update request based on the updated version parameter and the firmware version release record comprises:
obtaining first version release behavior information from the historical version release behavior information associated with the firmware version release record, the first version release behavior information being version release behavior information having a latest version release timestamp in the historical version release behavior information;
detecting whether the first version release behavior information comprises the updated version parameter;
determining that the firmware update request is the valid update request in response to detecting that the first version release behavior information comprises the updated version parameter; and
determining, in response to detecting that the first version release behavior information does not comprise the updated version parameter, the validity of the firmware update request based on second version release behavior information in the historical version release behavior information.

13. The apparatus according to claim 12, wherein the firmware update request further comprises a running version parameter of the first server node; and the determining, in response to detecting that the first version release behavior information does not comprise the updated version parameter, the validity of the firmware update request based on the second version release behavior information in the historical version release behavior information comprises:
searching, in response to detecting that the first version release behavior information does not comprise the updated version parameter, and in response to the second version release behavior information in the historical version release behavior information comprises the updated version parameter, the blockchain for M second server nodes on which firmware update is performed by using the updated version parameter, M being a positive integer greater than 2;

obtaining version update behavior information of the M second server nodes;

determining that the firmware update request is the valid update request in response to detecting that all the version update behavior information of the M second server nodes comprises the running version parameter; and determining that the firmware update request is the invalid update request in response to detecting that at least one version update behavior information in the version update behavior information of the M second server nodes does not comprise the running version parameter.

14. The apparatus according to claim 10, wherein the processor is further configured to perform:

returning to the execution node, in response to determining that the firmware update request is the valid update request, feedback information about performing a firmware update on the first server node, the feedback information being used for instructing the execution node to update the firmware version information of the first server node from running version information in the running version parameter to updated version information in the updated version parameter.

15. The apparatus according to claim 10, wherein the processor is further configured to perform:

determining, in response to detecting that the firmware update request is the invalid update request, that execution of the intelligent contract fails, and returning the invalid update request to the execution node; and identifying, when a next firmware update request corresponding to the first server node transmitted by the execution node is received, the next firmware update request as the invalid update request, the invalid update request being used for instructing the release node to generate alarm information for the execution node during security audit.

16. The apparatus according to claim 15, wherein the alarm information is obtained by the release node after the security audit is performed according to: an on-chain updated version parameter of the first server node obtained from the blockchain and an updated running version parameter locally acquired from the first server node.

17. The apparatus according to claim 10, wherein the processor is further configured to perform:

receiving confirmation information after the first server node signs the updated version parameter, the confirmation information indicating that the execution node has updated firmware version information of the first server node;

performing signature verification on the confirmation information by using public key information of the first server node;

determining, when the signature verification succeeds, that the invoking of the intelligent contract is completed; and updating the firmware version update record of the first server node based on the confirmation information and the firmware update request, and writing an updated firmware version update record into the blockchain based on a blockchain address of the first server node.

18. A non-transitory computer storage medium, storing a computer program, the computer program comprising program instructions, the program instructions, when executed by a processor of a contract node, causing the processor to perform:

receiving a firmware update request corresponding to a first server node transmitted by an execution node for a first server node, the firmware update request comprising an updated version parameter of the first server node;

invoking an intelligent contract according to the firmware update request;

obtaining, from a blockchain based on the intelligent contract, a firmware version update record and a firmware version release record that are associated with the first server node, wherein the firmware version release record is determined by a release node on the blockchain based on a consensus mechanism, and the firmware version update record includes a first version parameter and a second version parameter, and the second version parameter being a version parameter obtained after a firmware update is performed on the first version parameter; and determining validity of the firmware update request according to the firmware version update record, the firmware version release record, and the updated version parameter, comprising:

comparing the updated version parameter with the first version parameter in the firmware version update record;

determining, in response to detecting that the first version parameter is the same as the updated version parameter, that the firmware update request is an invalid update request, the invalid update request indicating that the execution node does not have permission to update firmware version information of the first server node; and determining, in response to detecting that the first version parameter is different from the updated version parameter, the validity of the firmware update request based on the updated version parameter and the firmware version release record.

\* \* \* \* \*